(12) United States Patent
Patel et al.

(10) Patent No.: US 12,591,873 B2
(45) Date of Patent: Mar. 31, 2026

(54) CROSS-SERVICE TRANSACTIONS FOR PEER-TO-PEER (P2P) PAYMENT PLATFORMS

(71) Applicant: Capital One Financial Corporation, McLean, VA (US)

(72) Inventors: Purvag Patel, Chicago, IL (US); Zizhao Gong, Chicago, IL (US); Ashley Kocanda, Gurnee, IL (US); Eric Hwang, Chicago, IL (US); Sanjeev Khatri, Des Plaines, IL (US); Subhrajyoti Mukhopadhyay, Arlington Heights, IL (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 18/928,746

(22) Filed: Oct. 28, 2024

(65) Prior Publication Data
US 2025/0124420 A1 Apr. 17, 2025

Related U.S. Application Data

(63) Continuation of application No. 17/673,209, filed on Feb. 16, 2022, now Pat. No. 12,131,307.

(51) Int. Cl.
| | |
|---|---|
| *G06Q 20/10* | (2012.01) |
| *G06Q 20/22* | (2012.01) |
| *G06Q 20/32* | (2012.01) |

(52) U.S. Cl.
CPC ......... *G06Q 20/223* (2013.01); *G06Q 20/102* (2013.01); *G06Q 20/3274* (2013.01)

(58) Field of Classification Search
None
See application file for complete search history.

(56) References Cited

U.S. PATENT DOCUMENTS

| | | |
|---|---|---|
| 9,904,924 B1 | 2/2018 | Dorsey et al. |
| 10,482,449 B1 | 11/2019 | Gantert |

(Continued)

FOREIGN PATENT DOCUMENTS

| | | |
|---|---|---|
| KR | 10-2017-0111821 A1 | 10/2017 |
| WO | 2021044185 A1 | 3/2021 |

OTHER PUBLICATIONS

European Patent Office, European Search Report mailed on Aug. 19, 2025, issued in connection with European Application No. 22927556.5, 9 pages.

(Continued)

*Primary Examiner* — Joseph W. King
(74) *Attorney, Agent, or Firm* — Lee Sullivan Shea & Smith LLP

(57) ABSTRACT

An example computing platform is configured to receive a request from a first user account of a first P2P payment service that a cross-service transaction be initiated with another user account of another P2P payment service. Based on the request, the computing platform generates a transaction identifier for the transaction and sends the identifier to the first P2P payment service's platform. Thereafter, the computing platform receives, from a second P2P payment service's platform, the transaction identifier and an identifier of a second user account of the second P2P payment service and responsively determines that the cross-service transaction comprises a transfer of funds between a first financial account associated with the first user account and a second financial account associated with the second user account. The computing platform then selects and causes a given payment rail platform to transfer funds between the first and second financial accounts.

20 Claims, 15 Drawing Sheets

(56)  References Cited

U.S. PATENT DOCUMENTS

| | | | |
|---|---|---|---|
| 11,100,490 | B1 | 8/2021 | Doyle et al. |
| 11,276,054 | B1 * | 3/2022 | Tomkins .............. G06Q 20/027 |
| 2014/0129428 | A1 * | 5/2014 | Tyler ................. G06Q 20/3276 |
| | | | 705/39 |
| 2015/0046331 | A1 | 2/2015 | Gupta et al. |
| 2018/0218344 | A1 | 8/2018 | Bahnub et al. |
| 2020/0193405 | A1 | 6/2020 | Bedier et al. |
| 2020/0267020 | A1 | 8/2020 | Doney et al. |
| 2020/0302520 | A1 | 9/2020 | Piparsaniya et al. |
| 2020/0342426 | A1 | 10/2020 | Grassadonia et al. |
| 2021/0241239 | A1 | 8/2021 | Ferguson et al. |
| 2022/0076234 | A1 * | 3/2022 | Bodalia .............. G06Q 20/3676 |
| 2022/0261774 | A1 | 8/2022 | Malhotra et al. |

OTHER PUBLICATIONS

International Searching Authority. International Search Report and Written Opinion issued in International Application No. PCT/US2022/053126, mailed on May 3, 2023, 13 pages.

* cited by examiner

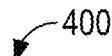

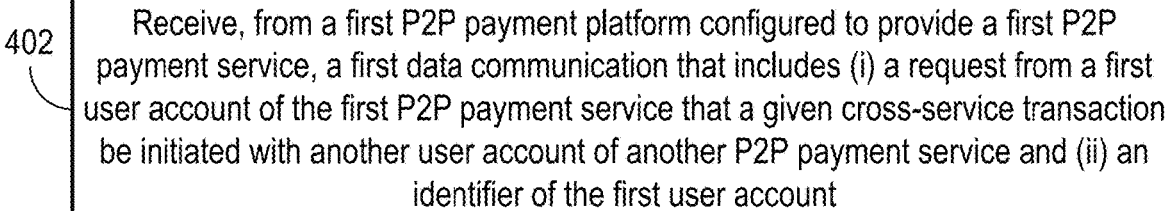

402 — Receive, from a first P2P payment platform configured to provide a first P2P payment service, a first data communication that includes (i) a request from a first user account of the first P2P payment service that a given cross-service transaction be initiated with another user account of another P2P payment service and (ii) an identifier of the first user account

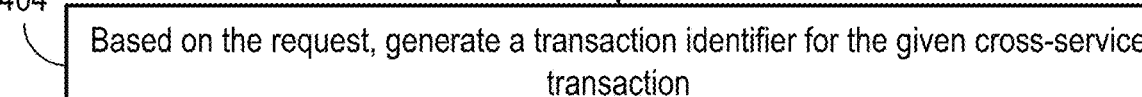

404 — Based on the request, generate a transaction identifier for the given cross-service transaction

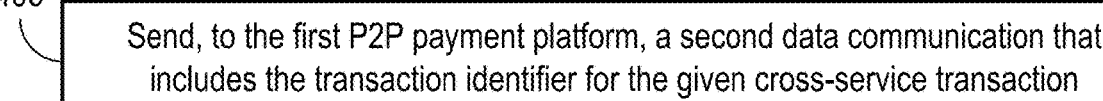

406 — Send, to the first P2P payment platform, a second data communication that includes the transaction identifier for the given cross-service transaction

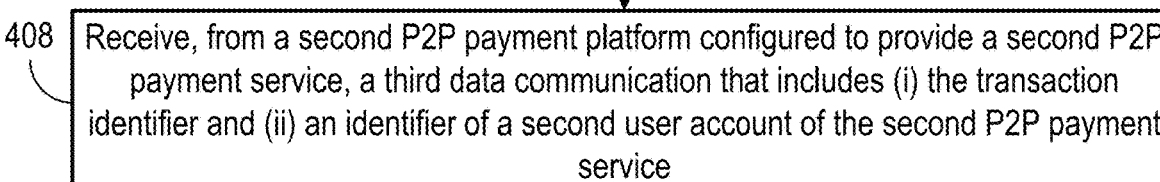

408 — Receive, from a second P2P payment platform configured to provide a second P2P payment service, a third data communication that includes (i) the transaction identifier and (ii) an identifier of a second user account of the second P2P payment service

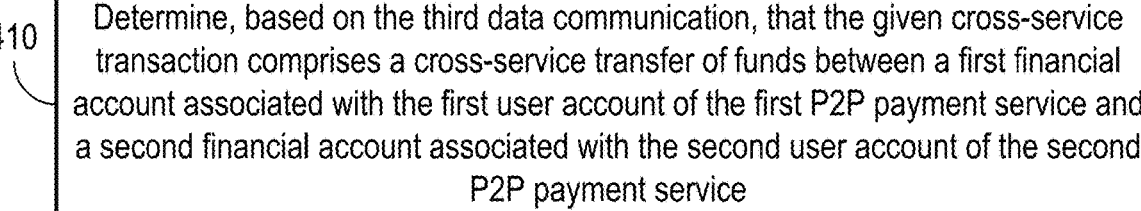

410 — Determine, based on the third data communication, that the given cross-service transaction comprises a cross-service transfer of funds between a first financial account associated with the first user account of the first P2P payment service and a second financial account associated with the second user account of the second P2P payment service 412 — Select a payment rail platform capable of transferring funds between the first financial account and the second financial account

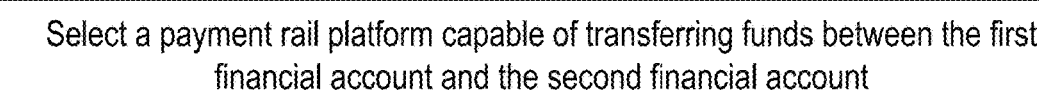

414 — Cause the selected payment rail platform to transfer funds between the first and second financial accounts

FIG. 4

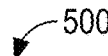
500

502   Receive, from a first client device associated with a first user account of a first P2P payment service, a first type of data communication indicating a request by the first user account of the first P2P payment service that a first cross-service transaction be initiated with another user account of another P2P payment service 504   Transmit, to a cross-service computing platform that facilitates cross-service transactions between independent P2P payment services, a second type of data communication indicating the request by the first user account of the first P2P payment service that the first cross-service transaction be initiated with another user account of another P2P payment service 506   Receive, from the cross-service computing platform, a third type of data communication including a first transaction identifier for the first cross-service transaction that has been generated by the cross-service computing platform 508   Transmit, to the first client device, a fourth type of data communication that causes the first client device to present the transaction identifier to a user of the first client device in a manner that enables the user of the first client device to provide the first transaction identifier for the first cross-service transaction to a user of another client device associated with the first user account of the second P2P payment service 510   Receive, from the cross-service computing platform, a fifth type of data communication indicating that the first cross-service transaction has been successfully settled

FIG. 5

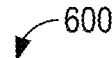

602 — Receive, from a second client device associated with a second user account of a first P2P payment service, a sixth type of data communication indicating a request by the second user account of the first P2P payment service to participate in a second cross-service transaction with a second user account of a second P2P payment service, wherein the sixth type of data communication comprises a second transaction identifier for the second cross-service transaction that (i) was initially generated by the cross-service computing platform based on a request from the second user account of the second P2P payment service and (ii) was subsequently received by the second client device 604 — Transmit, to the cross-service computing platform, a seventh type of data communication that indicates the request by the second user account of the first P2P payment service to participate in the second cross-service transaction with the second user account of the second P2P payment service, wherein the seventh type of data communication includes at least (i) the second transaction identifier and (ii) an identifier of the second user account of the first P2P payment service, and wherein the seventh type of communication causes the cross-service computing platform to invoke the second cross-service transaction 606 — Receive, from the cross-service computing platform, an eighth type of data communication indicating that the second cross-service transaction has been successfully settled

FIG. 6

CROSS-SERVICE TRANSACTIONS FOR PEER-TO-PEER (P2P) PAYMENT PLATFORMS

CROSS-REFERENCE TO RELATED APPLICATIONS

This application claims priority to, and is a continuation of, U.S. patent application Ser. No. 17/673,209 filed on Feb. 16, 2022 and entitled "CROSS-SERVICE TRANSACTIONS FOR PEER-TO-PEER (P2P) PAYMENT PLATFORMS," the contents of which are incorporated herein by reference in their entirety.

BACKGROUND

Systems for facilitating electronic transfers of funds are increasingly being developed as consumers continue to move away from cash-based transactions and toward cashless transactions. Peer-to-peer (P2P) payment environments, such as those offered by Venmo®, Cash App®, Zelle®, and PayPal®, are examples of such systems. Within a given P2P payment environment, one user of the environment may electronically transfer funds to another user of the environment using a computing device, such as the user's computer, smartphone, or tablet.

OVERVIEW

Disclosed herein is new software technology for facilitating cross-service transactions between independent peer-to-peer (P2P) payment services.

In one aspect, the disclosed technology may take the form of a method to be carried out by a computing platform that involves (i) receiving, from a first P2P payment platform configured to provide a first P2P payment service, a first data communication comprising a request from a first user account of the first P2P payment service that a given cross-service transaction be initiated with another user account of another P2P payment service, wherein the first data communication includes an identifier of the first user account; (ii) based on the request, generating a transaction identifier for the given cross-service transaction; (iii) sending, to the first P2P payment platform, a second data communication that includes the transaction identifier for the given cross-service transaction; (iv) thereafter receiving, from a second P2P payment platform configured to provide a second P2P payment service, a third data communication that includes (a) the transaction identifier and (b) an identifier of a second user account of the second P2P payment service; (v) determining, based on the third data communication, that the given cross-service transaction comprises a cross-service transfer of funds between a first financial account associated with the first user account of the first P2P payment service and a second financial account associated with the second user account of the second P2P payment service; (vi) selecting a payment rail platform capable of transferring funds between the first financial account and the second financial account; and (vii) causing the selected payment rail platform to transfer funds between the first and second financial accounts.

The first data communication may take various forms and, in some example embodiments, may include (i) data specifying an amount of funds to be transferred in the given cross-service transaction and/or (ii) data specifying whether the first user account is a payor or a payee in the given cross-service transaction.

The second data communication may take various forms and, in some example embodiments, may include a Quick Response (QR) code having the transaction identifier encoded therein.

The third data communication may take various forms and, in some example embodiments, may include (i) data specifying an amount of funds to be transferred in the given cross-service transaction and/or (ii) data specifying whether the second user account is a payor or a payee in the given cross-service transaction.

The determination that the given cross-service transaction comprises the cross-service transfer of funds between the first financial account associated with the first user account of the first P2P payment service and the second financial account associated with the second user account of the second P2P payment service may take various forms and, in some example embodiments, may be based on the third data communication including the transaction identifier.

The function of selecting the payment rail platform capable of transferring funds between the first financial account and the second financial account may take various forms and, in some example embodiments, may involve (i) determining a first financial institution that manages the first financial account, (ii) determining a second financial institution that manages the second financial account, (iii) determining that a particular payment rail platform is capable of transferring funds between the first financial institution and the second financial institution, and (iv) selecting the particular payment rail platform.

The function of determining that the particular payment rail platform is capable of transferring funds between the first financial institution and the second financial institution may take various forms and, in some example embodiments, may involve accessing a lookup table containing entries for compatible financial institutions for a plurality of payment rail platforms.

In some example embodiments, the method may also further involve (i) receiving, from the selected payment rail platform, a fourth data communication confirming the transfer of funds between the first and second financial accounts, (ii) sending, to the first P2P payment platform, a fifth data communication confirming the transfer of funds between the first and second financial accounts, and (iii) sending, to the second P2P payment platform, a sixth data communication confirming the transfer of funds between the first and second financial accounts.

In another aspect, the disclosed technology may take the form of a method to be carried out by a first computing platform associated with a first P2P payment service that involves interacting with a cross-service computing platform that facilitates cross-service transactions between independent P2P payment services. The method involves performing (i) a first process for interacting with the cross-service platform on behalf of a first user account of the first P2P payment service that comprises an initiating participant of a first cross-service transaction with a first user account of a second P2P payment service and (ii) a second process for interacting with the cross-service platform on behalf of a second user account of the first P2P payment service that comprises a joining participant of a second cross-service transaction with a second user account of the second P2P payment service. The first process may involve (i) receiving, from a first client device associated with the first user account of the first P2P payment service, a first type of data communication indicating a request by the first user account of the first P2P payment service that the first cross-service transaction be initiated with another user account of another P2P payment service; (ii) after receiving the first type of data communication, transmitting, to the cross-service computing platform, a second type of data communication indicating the request by the first user account of the first P2P payment service that the first cross-service transaction be initiated with another user account of another P2P payment service; (iii) after transmitting the second type of data communication, receiving, from the cross-service computing platform, a third type of data communication including a first transaction identifier for the first cross-service transaction that has been generated by the cross-service computing platform; (iv) after receiving the third type of data communication, transmitting, to the first client device, a fourth type of data communication that causes the first client device to present the transaction identifier to a user of the first client device in a manner that enables the user of the first client device to provide the first transaction identifier for the first cross-service transaction to a user of another client device associated with the first user account of the second P2P payment service; and (v) thereafter receiving, from the cross-service computing platform, a fifth type of data communication indicating that the first cross-service transaction has been successfully settled. The second process may involve (i) receiving, from a second client device associated with the second user account of the first P2P payment service, a sixth type of data communication indicating a request by the second user account of the first P2P payment service to participate in the second cross-service transaction with the second user account of the second P2P payment service, wherein the sixth type of data communication comprises a second transaction identifier for the second cross-service transaction that (a) was initially generated by the cross-service computing platform based on a request from the second user account of the second P2P payment service and (b) was subsequently received by the second client device; (ii) after receiving the sixth type of data communication, transmitting, to the cross-service computing platform, a seventh type of data communication that indicates the request by the second user account of the first P2P payment service to participate in the second cross-service transaction with the second user account of the second P2P payment service, wherein the seventh type of data communication includes at least (a) the second transaction identifier and (b) an identifier of the second user account of the first P2P payment service, and wherein the seventh type of data communication causes the cross-service computing platform to invoke the second cross-service transaction; and (iii) thereafter receiving, from the cross-service computing platform, an eighth type of data communication indicating that the second cross-service transaction has been successfully settled.

The second type of data communication may take various forms and, in some example embodiments, may include (i) data specifying an amount of funds to be transferred in the first cross-service transaction and/or (ii) data specifying whether the first user account of the first P2P payment service is a payor or a payee in the first cross-service transaction.

The third type of data communication and the fourth type of data communication may take various forms and, in some example embodiments, may each include a QR code having the first transaction identifier encoded therein.

The first cross-service transaction may take various forms and, in some example embodiments, may (i) include a transfer of funds between one financial account associated with the first user account of the first P2P payment service and another financial account associated with the first user account of the second P2P payment service and/or (ii) be settled by a payment rail platform that is selected by the cross-service computing platform.

The seventh type of data communication may take various forms and, in some example embodiments, may include (i) data specifying an amount of funds to be transferred in the second cross-service transaction and/or (ii) data specifying whether the second user account is a payor or a payee in the second cross-service transaction.

The second transaction identifier may take various forms and, in some example embodiments, may be encoded in a QR code that was received by the second client device.

The second cross-service transaction may take various forms and, in some example embodiments, may (i) include a transfer of funds between one financial account associated with the second user account of the first P2P payment service and another financial account associated with the second user account of the second P2P payment service and/or (ii) be settled by a payment rail platform that is selected by the cross-service computing platform.

In yet another aspect, disclosed herein is a computing platform that includes a network interface, at least one processor, at least one non-transitory computer-readable medium, and program instructions stored on the at least one non-transitory computer-readable medium that are executable by the at least one processor to cause the computing platform to carry out the functions disclosed herein, including, but not limited to, the functions of one or both of the foregoing methods.

In still another aspect, disclosed herein is a non-transitory computer-readable medium provisioned with program instructions that, when executed by at least one processor, cause a computing platform to carry out the functions disclosed herein, including, but not limited to, the functions of one or both of the foregoing methods.

One of ordinary skill in the art will appreciate these as well as numerous other aspects in reading the following disclosure.

BRIEF DESCRIPTION OF THE DRAWINGS

FIG. 4 depicts a flow diagram of an example process for facilitating a cross-service transaction between independent P2P payment platforms according to aspects of the disclosed technology.

FIG. 5 depicts a flow diagram of an example process for interacting with a cross-service payment platform on behalf of a first user account of a first P2P payment service that comprises an initiating participant of a first cross-service transaction with a first user account of a second P2P payment service according to aspects of the disclosed technology.

FIG. 6 depicts a flow diagram of an example process for interacting with a cross-service payment platform on behalf of a second user account of the first P2P payment service that comprises a joining participant of a second cross-service transaction with a second user account of the second P2P payment service according to aspects of the disclosed technology.

Figure 1A:
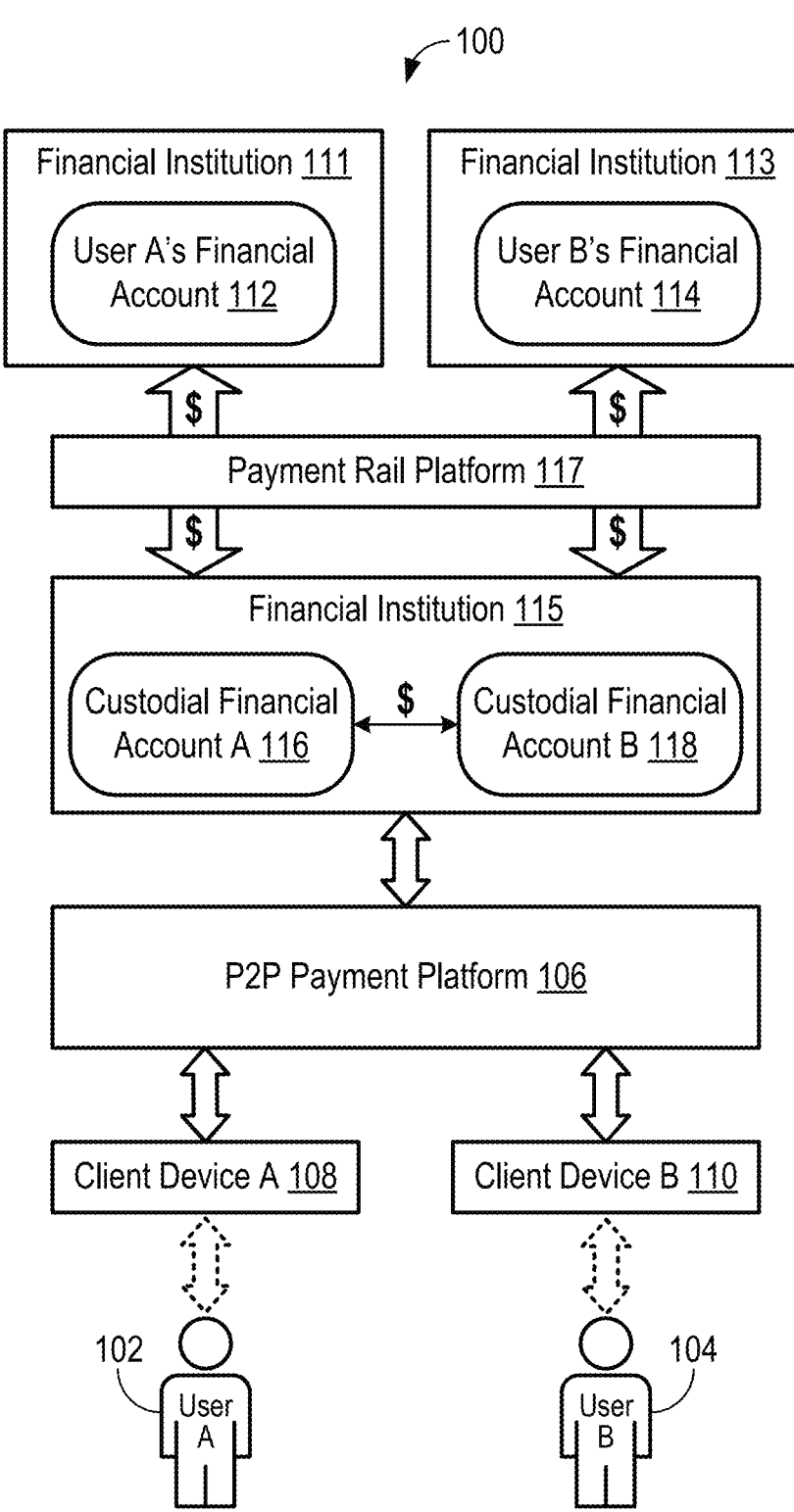
FIG. 1A depicts an example P2P payment environment according to aspects of the disclosed technology.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As noted above, disclosed herein is new software technology for facilitating cross-service transactions between independent peer-to-peer (P2P) payment services.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example P2P Payment Platform Environment

Turning now to the figures, FIG. 1A depicts an example P2P payment environment 100 that may be used to transfer funds between two or more users, depicted here, for the sake of discussion, as user A 102 and user B 104. As shown in FIG. 1A, the P2P payment environment 100 includes a P2P payment platform 106 that is configured to provide a "P2P payment service," which may be communicatively coupled to client device A 108 that is operated by user A 102, and client device B 110 that is operated by user B 104.

The P2P payment service that is provided by the P2P payment platform 106 may take various forms. Examples of such P2P payment services may include Venmo®, Cash App®, Zelle®, PayPal®, or any other P2P payment service that allows for the transfer funds between users that have linked their financial accounts to the P2P payment service.

In practice, the P2P payment platform 106 may comprise one or more computing systems that have been installed with back-end software (e.g., program code) for providing an example P2P payment service to users over a data network. The one or more computing systems of the P2P payment platform 106 may collectively comprise some set of physical computing resources, such as one or more processor components, data storage components, and communication interface components, and this set of computing resources take various forms and be arranged in various manners.

For instance, as one possibility, the P2P payment platform 106 may comprise cloud computing resources that are supplied by a third-party provider of "on demand" cloud computing resources, such as Amazon Web Services (AWS), Amazon Lambda, Google Cloud Platform (GCP), Microsoft Azure, or the like, which may be provisioned with back-end software for providing a P2P payment service. As another possibility, the P2P payment platform 106 may comprise "on-premises" computing resources of the organization that operates the P2P payment platform 106 (e.g., organization-owned servers), which may be provisioned with back-end software for providing a P2P payment service. As yet another possibility, the P2P payment platform 106 may comprise a combination of cloud computing resources and on-premises computing resources. Other implementations of the P2P payment platform 106 are possible as well. One possible example of the components that may be included in an example computing platform is illustrated and described below with reference to FIG. 7.

In turn, client device A 108 and client device B 110 may each be any computing device that is capable of accessing and interacting with the P2P payment service provided by the P2P payment platform 106 via front-end software running on the client devices (e.g., a mobile application and/or a front end of a web application). In this respect, the client devices may each include hardware components such as a processor, data storage, a communication interface, and user-interface components (or interfaces for connecting thereto), among other possible hardware components, as well as software components that facilitate the client station's ability to access and interact with the P2P payment service provided by the P2P payment platform 106 (e.g., operating system software, web browser software, mobile applications, etc.). As representative examples, client device A 108 and client device B 110 may each take the form of a desktop computer, a laptop, a netbook, a tablet, a smartphone, and/or a personal digital assistant (PDA), among other possibilities.

As shown in FIG. 1A, client device A 108 and client device B 110 may interact with the P2P payment platform 106 via respective communication paths. Each of these communication paths may generally comprise one or more data networks and/or data links, which may take any of various forms. For instance, each respective communication path may include a point-to-point data link, a Personal Area Network (PAN), a Local Area Network (LAN), a Wide Area Network (WAN) such as the Internet or a cellular network, and/or a cloud network, among other possibilities. Further, the data networks and/or links that make up each respective communication path may be wireless, wired, or some combination thereof, and may carry data according to any of various different communication protocols. Although not shown, the respective communication paths may also include one or more intermediate systems, one example of which may take the form of a host server, among other possibilities. Other examples are also possible.

Using the front-end software running on client device A 108, user A 102 may create a user account with the P2P payment platform 106. For instance, user A 102 may input account credentials, such as a username and a password, via a user interface of client device A 108 while client device A is running the front-end software, and client device A 108 may send the account credentials to the P2P payment platform 106. The P2P payment platform 106 may create a data entity defining a user account of user A 102 and may store the account credentials in association with the user account. In a similar manner, user B 104 may create a user account with the P2P payment platform 106 using the front-end software running on client device B 110.

User A 102 may additionally link a financial account, such as user A's financial account 112 with a first financial institution 111, to the P2P payment platform 106. The financial account may take various forms, such as a bank account (e.g., a checking account or a savings account), a credit card account, or a debit card account. In order to link the account, user A 102 may input details of user A's financial account 112, such as an account number and a routing number for a bank account or a card number, expiration date, and Card Verification Value (CVV) code for a credit card or debit card, via the user interface of client device A 108 while client device A is running the front-end software. Client device A 108 may send the input the financial account details to the P2P payment platform 106, and the P2P payment platform 106 may store the financial account details in association with the user account. In a similar manner, user B 104 may link user B's financial account 114 with a second financial institution 113 to the P2P payment platform 106 using the front-end software running on client device B 110.

In practice, financial institutions 111 and 113 may each comprise any financial institution with which a user may be able to open a financial account that can be linked with the P2P payment platform 106, including but not limited to banks and/or credit card issuers, among other possible types of financial institutions. Further, financial institutions 111 and 113 may each operate its own respective computing platform that is capable of performing the functions related to the P2P payment service that are described herein, including but not limited to electronic transfer of funds. Similar to the P2P payment platform 106, the respective computing platform of each of financial institutions 111 and 113 may comprise one or more computing systems that have been provisioned with software (e.g., program code) for performing the financial-institution functions disclosed herein, among various other functions.

Further, the P2P payment platform 106 may cause custodial financial accounts to be opened and maintained for its users at a third financial institution 115, which may be referred to as the "custodial" financial institution for the P2P payment service. For instance, the P2P payment platform 106 may cause financial institution 115 to open a custodial financial account A 116 for user A 102 and a custodial financial account B 118 for user B 104. The P2P payment platform 106 may store the account details for any given custodial account in connection with the corresponding user account, and the P2P payment platform 106 may then use these custodial financial accounts for various purposes in connection with the P2P payment service. For instance, the custodial financial account associated with each user may be used to hold any funds that the user has accumulated while using the P2P payment service, either by virtue of receiving transfers from other users of the P2P payment service or by "loading" funds from the user's own financial account to the custodial financial account. Additionally, the P2P payment platform 106 may use the custodial financial accounts to facilitate funds transfers between users of the P2P payment service.

In practice, financial institution 115 that maintains the custodial financial accounts may be any financial institution that is capable of serving as a custodial financial institution for the P2P payment service, including but not limited to a bank. For instance, Venmo® typically uses Wells Fargo Bank, N.A. or The Bancorp Bank as its custodial financial institution, while other P2P payment services use other custodial financial institutions. Further, financial institution 115 may operate its own respective computing platform that is capable of performing the functions related to the P2P payment service that are described herein, including but not limited to enabling electronic access to and electronic transfer of funds with custodial accounts. As with the P2P payment platform 106, the computing platform of financial institution 115 may comprise one or more computing systems that have been provisioned with software (e.g., program code) for performing the financial-institution functions disclosed herein, among various other functions.

As shown in FIG. 1A, the P2P payment platform 106 may be capable of communicating with the computing platform of the third financial institution 115 via a respective communication path, which may generally comprise one or more data networks and/or data links that may be wireless, wired, or some combination thereof, may take any of various forms (e.g., a point-to-point data link, a PAN, a LAN, a WAN, and/or a cloud network, etc.), and may carry data according to any of various different communication protocols.

Additionally, as shown in FIG. 1A, the computing platform of the third financial institution 115 may be configured to electronically transfer funds with the respective computing platform of each of financial institutions 111 and 113 via a given payment rail platform 117 that is capable of electronically transferring funds between such financial institutions, which typically takes the form of an Automated Clearing House (ACH) network in a P2P payment environment.

Additionally yet, although not shown, the P2P payment platform 106 may be capable of communicating with the given payment rail platform 117 via a respective communication path, which may enable the P2P payment platform 106 to initiate electronic transfers of funds between financial institution 115 and either financial institution 111 or financial institution 113.

While financial institutions 111, 113, and 115 are shown and described as different financial institutions, it should also be understood that some or all of these financial institutions could be the same. For example, if users A and B happen to link accounts from the same financial institution, then financial institutions 111 and 113 may be the same financial institution. As another example, it is possible that user A and/or user could link an account from the same financial institution that is serving as the custodial financial institution for the P2P payment service. Other examples are possible as well.

As noted above, the P2P payment platform 106 uses the custodial financial accounts at financial institution 115 to facilitate funds transfers between users of the P2P payment service. For instance, if user A 102 wishes to transfer funds to user B 104, user A 102 may input a request to transfer funds via the front-end software running on client device A 108, which may relay the request to the P2P payment platform 106. The request may specify the amount of funds and may identify user B 104 (e.g., by username or some other identifier of user B's account) as the intended payee of the funds. In turn, the P2P payment platform 106 may responsively cause the funds to be transferred from custodial financial account A 116 to custodial financial account B 118 (instead of directly between user A's financial account 112 and user B's financial account 114) by sending an instruction to financial institution 115 over the respective communication path between the P2P payment platform 106 and the computing platform of financial institution 115.

If there is not a sufficient balance in custodial financial account A 116 to cover the entire amount of this transfer, then the P2P payment platform 106 may also initiate a transfer of funds from user A's financial account 112 at financial institution 111 to custodial financial account A 116 (or perhaps directly to custodial financial account B 118) at financial institution 115 in order to properly fund the transfer. In practice, the P2P payment platform 106 may carry out this function either prior to, in parallel with, or subsequent to initiating the transfer between custodial financial account A 116 and custodial financial account B 118, and the transfer between financial institution 111 and financial institution 115 may be carried out via the given payment rail platform 117 (e.g., an ACH network).

Conversely, user A 102 may request funds from user B 104 through the P2P payment platform 106. For instance, user A 102 may input a request to receive funds via the front-end software running on client device A 108. The request may specify the amount of funds and may identify user B 104 (e.g., by username or some other identifier of user B's account) as the intended payor of the funds. Client device A 108 may send the request to the P2P payment platform 106, and the P2P payment platform 106 may seek authorization of the funds transfer from user B 104. For instance, the P2P payment platform 106 may cause the front-end software running on client device B 110 to display a prompt for authorizing the transfer. In response to receiving authorization from user B 104, the P2P payment platform 106 may cause the funds to be transferred from custodial financial account B 118 to custodial financial account A 116 (instead of directly between user B's financial account 114 and user A's financial account 112) by sending an instruction to financial institution 115 over the respective communication path between the P2P payment platform 106 and the computing platform of financial institution 115.

If there is not a sufficient balance in custodial financial account B 118 to cover the entire amount of this transfer, then along similar lines to the above, the P2P payment platform 106 may also initiate a transfer of funds from user B's financial account 114 at financial institution 113 to custodial financial account B 118 (or perhaps directly to custodial financial account A 116) at financial institution 115 in order to properly fund the transfer. In practice, the P2P payment platform 106 may carry out this function either prior to, in parallel with, or subsequent to initiating the transfer between custodial financial account B 118 and custodial financial account A 116, and the transfer between financial institution 113 and financial institution 115 may be carried out via the given payment rail platform 117 (e.g., an ACH network).

Additionally, the P2P payment platform 106 may enable a user to transfer funds back into the user's financial account from the user's corresponding custodial account. For instance, user A 102 may input a request to transfer a specified amount of funds out of his or her user account with the P2P payment service and into the user's financial account via the front-end software running on client device A 108. Client device A 108 may send the request to the P2P payment platform 106, which may responsively cause the funds to be transferred from custodial financial account A 116 at financial institution 115 to user A's financial account 112 at financial institution 111 via the given payment rail platform 117 (e.g., an ACH network) using user A's stored financial account details.

Additionally yet, the P2P payment platform 106 may be configured to indicate to its users the balances of their respective custodial accounts. For instance, when user A 102 accesses his or her user account with the P2P payment service via the front-end software running on client device A 108, the P2P payment platform 106 may cause the front-end software to display a balance of custodial financial account A 116, which the P2P payment platform 106 may determine by either accessing stored information at the P2P payment platform 106 (to the extent that up-to-date balance information is available) or querying the third financial institution 115 where custodial financial account A 116 is held by sending a communication over the respective communication path between the P2P payment platform 106 and the third financial institution's computing platform.

As noted above, custodial financial account A 116 and custodial financial account B 118 are held at the same financial institution 115, and the P2P payment platform 106 is the custodian of both of these accounts. Because of this, it is not necessary to use a payment rail platform (e.g., an ACH network) to transfer funds between custodial financial account A 116 and custodial financial account B 118, and the P2P payment platform 106 may also be able to bypass certain other procedures (e.g., regulatory or otherwise) that may add additional delay or fees to the transfer of funds between these accounts. Accordingly, the P2P payment environment 100 depicted in FIG. 1A may be useful for quickly and easily transferring funds between two users of the P2P payment services.

For these reasons, the popularity of P2P payment services continues to grow, and there are now several different P2P payment services that users can utilize to transfer funds, including Venmo®, Cash App®, Zelle®, and PayPal®. However, there is presently no technology that allows users of two different P2P payment services to transfer funds between one another using those P2P payment services, which degrades the user experience and usefulness of these P2P payment services. For example, if a first user is subscribed to a first P2P payment service (e.g., Venmo®) and a second user is subscribed to a second, different P2P payment service (e.g., Zelle®), these users are presently forced to use something other than their preferred P2P payment services in order to transfer funds, which is undesirable.

Figure 1B:
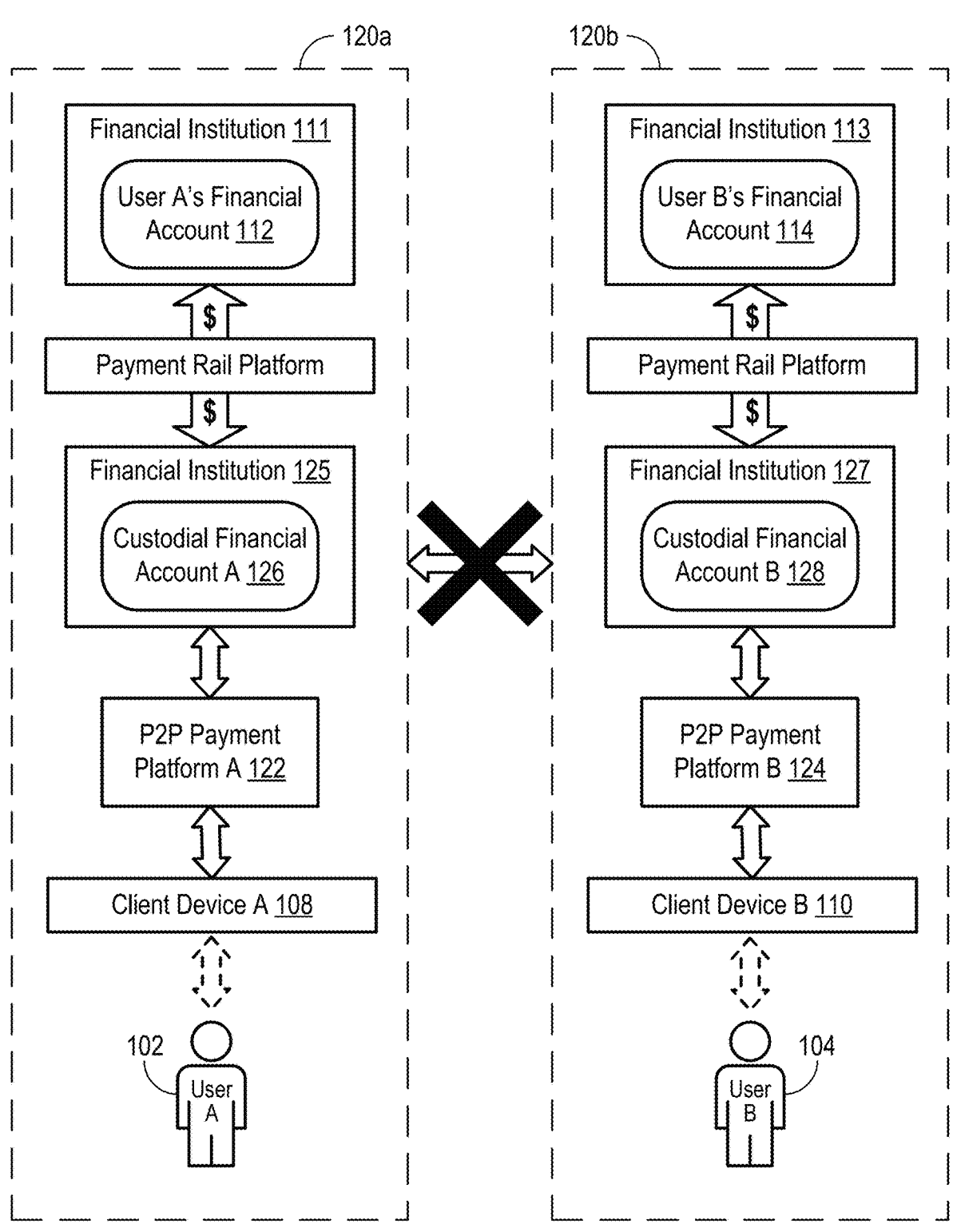
FIG. 1B depicts an example configuration of two P2P payment environments according to aspects of the disclosed technology.

To illustrate, FIG. 1B depicts an example in which user A 102 and user B 104 are users of two different P2P payment services, which are implemented via two different P2P payment environments-a first P2P payment environment 120a for the first P2P payment service and a second P2P payment environment 120b for the second P2P payment service. In this example, user A 102 has a user account with a P2P payment platform A 122 that is configured to provide the first P2P payment service within the first P2P payment environment 120a, and user B 104 has a user account with a P2P payment platform B 124 that is configured to provide the second P2P payment service within the second P2P payment environment 120b.

As with the P2P payment platform 106, each of P2P payment platform A 122 and P2P payment platform B 124 may interact with a respective custodial financial institution that maintains the custodial financial accounts associated with the respective P2P payment service provided by the P2P payment platform. For instance, P2P payment platform A 122 may cause custodial financial account A 126 to be opened and maintained at financial institution 125, which may facilitate transfers of funds between user A 102 and other users of the first P2P payment service provided by P2P payment platform A 122. Similarly, P2P payment platform B 124 may cause custodial financial account B 128 to be opened and maintained at financial institution 127, which may facilitate transfers of funds between user B 104 and other users of P2P payment platform B 128.

However, because the first P2P payment environment 120*a* and the second P2P payment environment 120 are independent of one another, it is presently not possible for a "cross-service" transfer of funds to be executed between user A of the first P2P payment service and user B of the second P2P payment service. For instance, as an initial matter, P2P payment platform A 122 does not have user information for user B and P2P payment platform B 124 does not have user information for user A, which inhibits the ability of either P2P payment platform A 122 or P2P payment platform B 124 to initiate a transaction between user A and user B, and there is presently no technology that would enable P2P payment platform A 122 and P2P payment platform B 124 to share user information or otherwise interface with one another to carry out a cross-service transaction. Additionally, because custodial financial account B 128 is maintained by P2P payment platform B 124 at financial institution 127, which is a different financial institution than financial institution 125 where P2P platform A 122 maintains custodial financial accounts, P2P payment platform A 122 does not have access to custodial financial account B 128 and cannot initiate transactions involving custodial financial account B 128. Likewise, because custodial financial account A 126 is maintained by P2P payment platform A 122 at financial institution 125, which is a different financial institution than financial institution 127 where P2P platform B 124 maintains custodial financial accounts, P2P payment platform B 124 does not have access to custodial financial account A 126 and cannot initiate transactions involving custodial financial account A 126.

Because such P2P payment environments do not support cross-service transactions, users may find themselves creating accounts with multiple different P2P payment services instead of only their preferred P2P payment service in order to be able to send and receive funds to and from their various personal contacts that may use different preferred P2P payment services. However, maintaining multiple different accounts across multiple different P2P payment services may be cumbersome and may result in a poor user experience, along with potentially exposing users to additional security risks. The technology described herein may help address these or other issues by allowing users to transfer funds to one another via cross-service transactions between different P2P payment services.

II. Example Cross-Service P2P Payment Configuration

Figure 2:
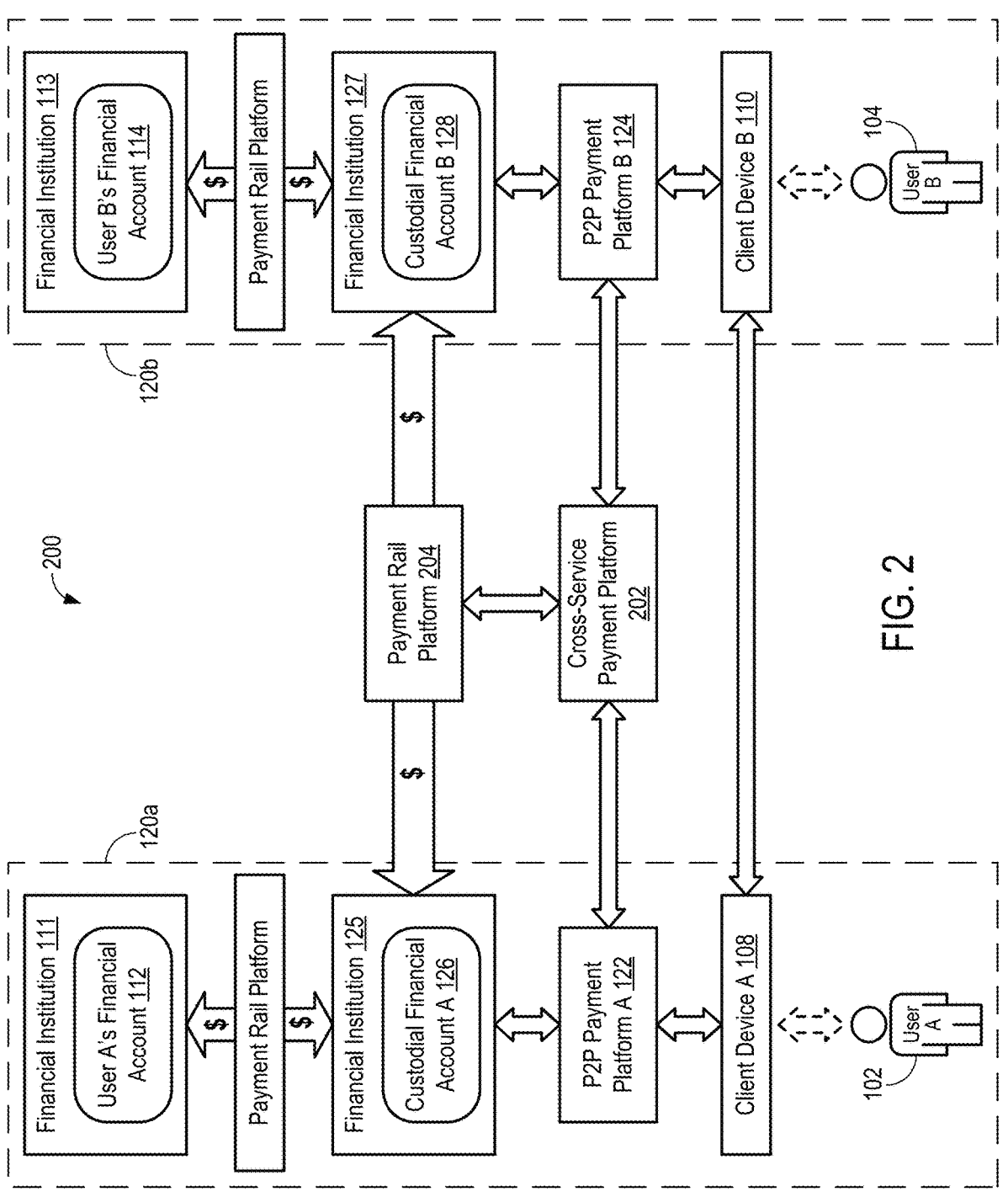
FIG. 2 depicts an example cross-service P2P payment environment according to aspects of the disclosed technology.

FIG. 2 depicts an example cross-service P2P payment configuration 200 that may be used to transfer funds between users of independent P2P payment services. As in FIG. 1B, the configuration 200 depicted in FIG. 2 shows two independent P2P payment environments 120*a* and 120*b*, but the configuration 200 depicted in FIG. 2 additionally includes a cross-service payment platform 202 that is configured to facilitate cross-service transactions between the two independent P2P payment environments 120*a* and 120*b*.

In practice, the cross-service payment platform 202 may comprise one or more computing platforms that have been installed with software (e.g., program code) for performing the functions disclosed herein for facilitating cross-service transactions between independent P2P payment environments. The one or more computing systems of the cross-service payment platform 202 may collectively comprise some set of physical computing resources, such as one or more processor components, data storage components, and communication interface components, and this set of computing resources take various forms and be arranged in various manners.

For instance, as one possibility, the cross-service payment platform 202 may comprise cloud computing resources that are supplied by a third-party provider of "on demand" cloud computing resources, such as AWS, Amazon Lambda, GCP, Microsoft Azure, or the like, which may be provisioned with back-end software for performing the functionality disclosed herein. As another possibility, the P2P payment platform 106 may comprise "on-premises" computing resources of the organization that operates the cross-service payment platform 202 (e.g., organization-owned servers), which may be provisioned with back-end software for performing the functionality disclosed herein. As yet another possibility, the cross-service payment platform 202 may comprise a combination of cloud computing resources and on-premises computing resources. Other implementations of the cross-service payment platform 202 are possible as well. One possible example of the components that may be included in an example computing platform is illustrated and described below with reference to FIG. 7.

Further, in accordance with the present disclosure, P2P payment platform A 122 and P2P payment platform B 124 may each be provisioned with additional back-end software that enables these platforms to interface with the cross-service payment platform 202 in the manner described herein, so as to enable these P2P payment platforms to provide their users with the ability to engage in cross-service transactions.

As shown in FIG. 2, the cross-service payment platform 202 may be communicatively coupled to P2P payment platform A 122 and P2P payment platform B 124 via respective communication paths. Each of these communication paths may generally comprise one or more data networks and/or data links, which may take any of various forms. For instance, each respective communication path may include a point-to-point data link, a PAN, a LAN, a WAN such as the Internet or a cellular network, and/or a cloud network, among other possibilities. Further, the data networks and/or links that make up each respective communication path may be wireless, wired, or some combination thereof, and may carry data according to any of various different communication protocols. Although not shown, the respective communication paths may also include one or more intermediate systems, one example of which may take the form of a host server, among other possibilities. Other examples are also possible.

Additionally, the cross-service payment platform 202 may be capable of communicating with and utilizing any of a plurality of different payment rail platforms that are each capable of electronically transferring funds between certain financial institutions. For example, FIG. 2 shows that the cross-service payment platform 202 is communicatively coupled via a respective communication path to one representative payment rail platform 204 that is capable of electronically transferring funds between financial institution 125 and financial institution 127. In a similar manner, the cross-service payment platform 202 may also be communicatively coupled to one or more other payment rail platforms as well.

The payment rail platforms that are available for use by the cross-service payment platform 202 to electronically transfer funds between financial institutions involved in a cross-service transaction could take any of various forms. As one example, such payment rail platforms may include one or more ACH networks, such as the one operated by National Automated Clearinghouse Association (NACHA). As another example, such payment rail platforms may include one or more credit card networks, such as those operated by Discover®, American Express®, Mastercard®, and/or Visa®. As yet another example, such payment rail platforms may include one or more international payments networks, such as those operated by the Society for Worldwide Interbank Financial Telecommunications (SWIFT) or Ripple. As still another example, such payment rail platforms may include one or more real-time payment networks, such as The Clearing House RTP® network. As a further example, such payment rail platforms may include one or more wire transfer networks, such as Fedwire and/or the Clearing House Interbank Payments System (CHIPS). The payment rail platforms that are available for use by the cross-service payment platform 202 to electronically transfer funds between financial institutions involved in a cross-service transaction could take other forms as well.

In practice, each such payment rail platform may comprise one or more computing systems that have been provisioned with software (e.g., program code) for performing the payment-rail functions disclosed herein, including but not limited to receiving requests to electronically transfer funds and executing electronic transfers of funds. Further, the respective communication path between the cross-service payment platform 202 and each such payment rail platform may generally comprise one or more data networks and/or data links that may be wireless, wired, or some combination thereof, may take any of various forms (e.g., a point-to-point data link, a PAN, a LAN, a WAN, and/or a cloud network, etc.), and may and may carry data according to any of various different communication protocols.

As described in further detail in connection with FIGS. 3A-3G, the cross-service payment platform 202 may be configured to act as an intermediary between P2P payment platform A 122 and P2P payment platform B 124 to (i) determine the transaction details of a desired transfer of funds between user A 102 and user B 104, (ii) determine the account details of custodial financial account A 126 and custodial financial account B 128, and (iii) initiate the transfer of funds by identifying a payment rail platform that is capable of performing a transfer of funds between custodial financial account A 126 at financial institution 125 and custodial financial account B 128 at financial institution 127 and causing the identified payment rail platform 204 to execute the transfer of funds.

Figure 3A:
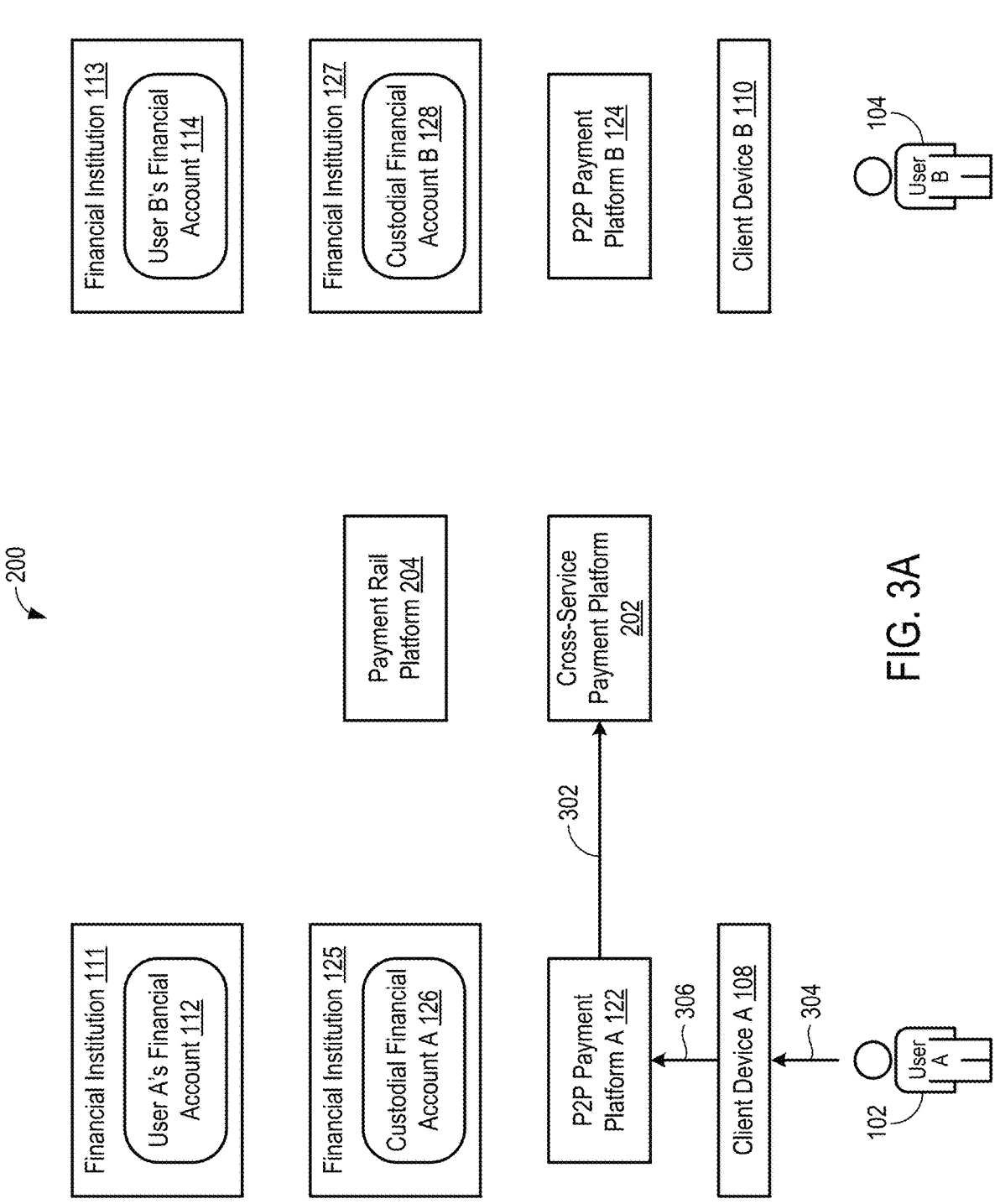
FIG. 3A depicts an example operation within the cross-service P2P payment environment depicted in FIG. 2 according to aspects of the disclosed technology.

Turning now to the operations that may be carried out within the cross-service P2P payment configuration 200, as shown in FIG. 3A, the cross-service payment platform 202 may be configured to receive a data communication 302 from P2P payment platform A 122 that includes a request to initiate a given cross-service transaction between user A's account with P2P payment platform A 122 and some other user account of another P2P payment platform.

P2P payment platform A 122 may send data communication 302 to the cross-service payment platform 202 based on an input from user A 102. For instance, user A 102 may provide user input 304 via the front-end software of the P2P payment application hosted by P2P payment platform A 122 and running on client device A 108. User input 304 may include a request to initiate the given cross-service transaction and may take various forms, such as a touch input (e.g., a button press) or a voice command. Based on user input 304, client device A 108 may send data communication 306 to inform P2P payment platform A 122 of user A's request to initiate the given cross-service transaction, and P2P payment platform A 122 may responsively send data communication 302 to the cross-service payment platform 202.

Data communication 302 may include an identifier of user A's account with P2P payment platform A 122, which may take various forms such as one or more of a username or email address associated with user A's account, details of custodial financial account A 126 (e.g., the account number and/or routing number), details of client device A 108 (e.g., a network address, a mobile phone number, or the like), or any other distinct identifier of user A's account.

In examples where the identifier of user A's account does not explicitly include the account details (e.g., the account number and/or routing number) of custodial financial account A 126, the cross-service payment platform 202 may use the identifier of user A's account to determine the account details of custodial financial account A 126. For instance, the cross-service payment platform 202 may maintain or otherwise be provisioned with a lookup table containing entries for custodial financial accounts managed by P2P payment platform A 122. A given entry for a given custodial financial account may be associated with one or more identifiers of a corresponding user account, such as those identified above that may be included in data communication 302. As such, the cross-service payment platform 202 may access the lookup table and use the identifier of user A's account in data communication 302 to determine the account details of custodial financial account A 126. Namely, the cross-service payment platform 202 may identify the entry for custodial financial account A 126 as the entry associated with the identifier of user A's account in data communication 302. The cross-service payment platform 202 may populate the lookup table based on user data provided in advance to the cross-service payment platform 202 by P2P payment platform A 122. Additionally or alternatively, the cross-service payment platform 202 may continue to update the lookup table based on user data (e.g., user account identifiers and/or financial account details) received from P2P payment platform A 122 when facilitating cross-service transactions as described herein.

In some examples, data communication 302 may additionally include one or more details of the given cross-service transaction, such as data indicating an amount of funds to be transferred in the transaction and/or whether user A's account is the payor or payee in the transaction. To facilitate this, user A 102 may specify such details of the given cross-service transaction in user input 304, and client device A 108 may send the details to P2P payment platform A 122 in data communication 306 for inclusion in data communication 302.

After receiving data communication 302, and based on the included request to initiate the given cross-service transaction between user A's account with P2P payment platform A 122 and another user account of another P2P payment platform, the cross-service payment platform 202 may generate a transaction identifier for the given cross-service transaction. The transaction identifier may take various forms, such as a distinct alphanumeric string or the like. The cross-service payment platform 202 may store the transaction identifier in a data storage of the cross-service payment platform 202. Further, the cross-service payment platform 202 may store in association with the transaction identifier any of the details of the given cross-service transaction received from P2P payment platform A 122 in data communication 302.

Figure 3B:
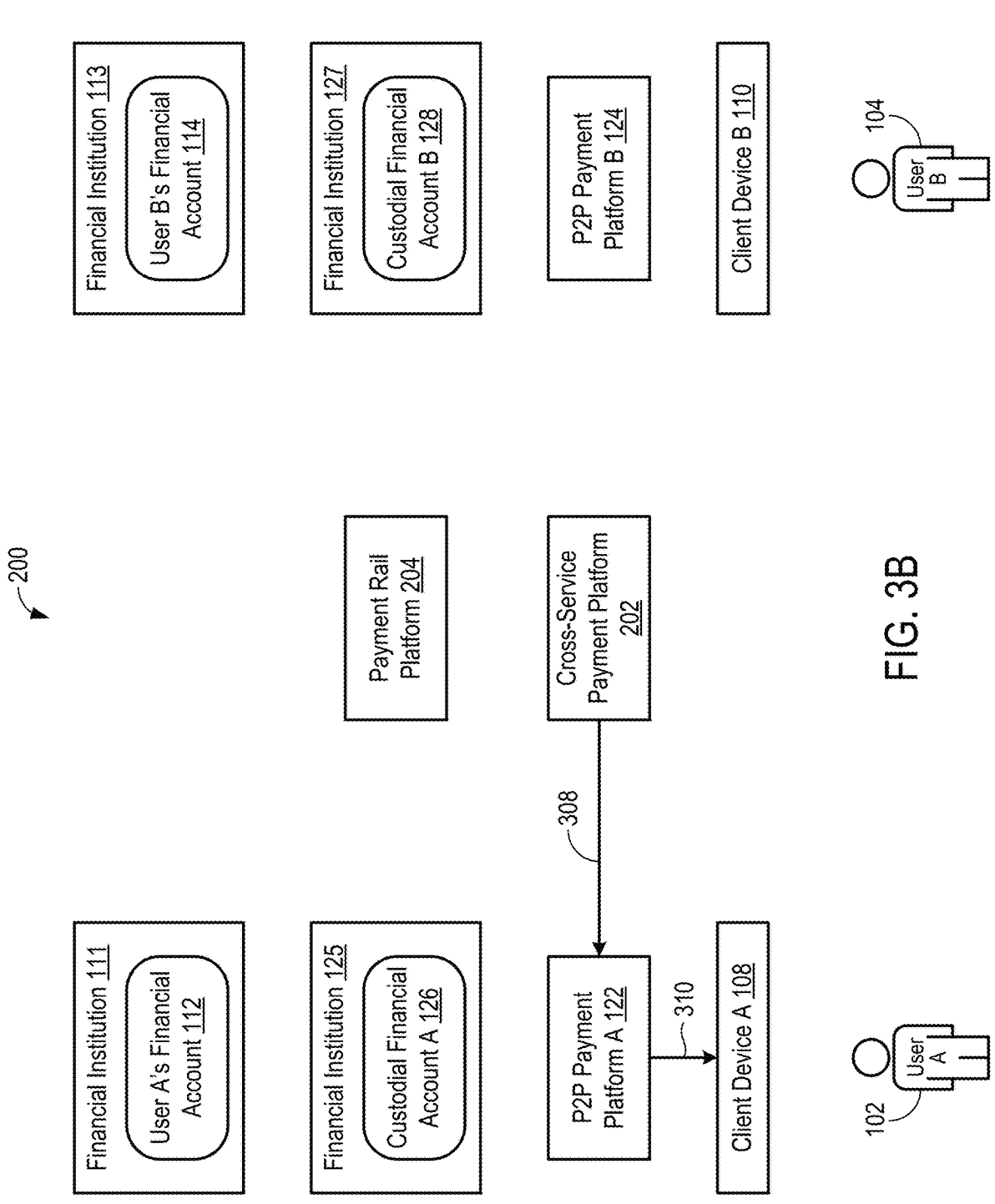
FIG. 3B depicts another example operation within the cross-service P2P payment environment depicted in FIG. 2 according to aspects of the disclosed technology.

As shown in FIG. 3B, after generating the transaction identifier for the given cross-service transaction, the cross-service payment platform 202 may send data communication 308 to P2P payment platform A 122. The cross-service payment platform 202 may include the transaction identifier for the given cross-service transaction in data communication 308 and may do so in various ways. In some examples, the cross-service payment platform 202 may encode the transaction identifier in a Quick Response (QR) code and include the QR code in data communication 308. In other examples, the cross-service payment platform 202 may send the transaction identifier to P2P payment platform A 122 in data communication 308 without encoding or otherwise changing the form of the identifier.

Further, P2P payment platform A 122 may send a data communication 310 that includes the transaction identifier to client device A 108. In examples where the cross-service payment platform 202 has encoded the transaction identifier in a QR code, P2P payment platform A 122 may send the QR code to client device A 108 in data communication 310. In examples where the cross-service payment platform 202 has not encoded the transaction identifier in a QR code, P2P platform A 122 may send the unencoded transaction identifier to client device A 108 in data communication 310, or P2P platform A 122 may encode the transaction identifier into a QR code and send the QR code to client device A 108 in data communication 310. Further, in some examples, the cross-service payment platform 202 may send the transaction identifier to client device A 108 directly, for instance by sending the transaction identifier to an email address, network address, or phone number included in data communication 302.

Data communication 310 may cause client device A 108 to present the transaction identifier to user A 102 in a manner that enables user A 102 to provide the transaction identifier to user B 104. For instance, data communication 310 may include an instruction that causes client device A 108 to display the transaction identifier, for instance by displaying the QR code in which the transaction identifier is encoded.

Figure 3C:
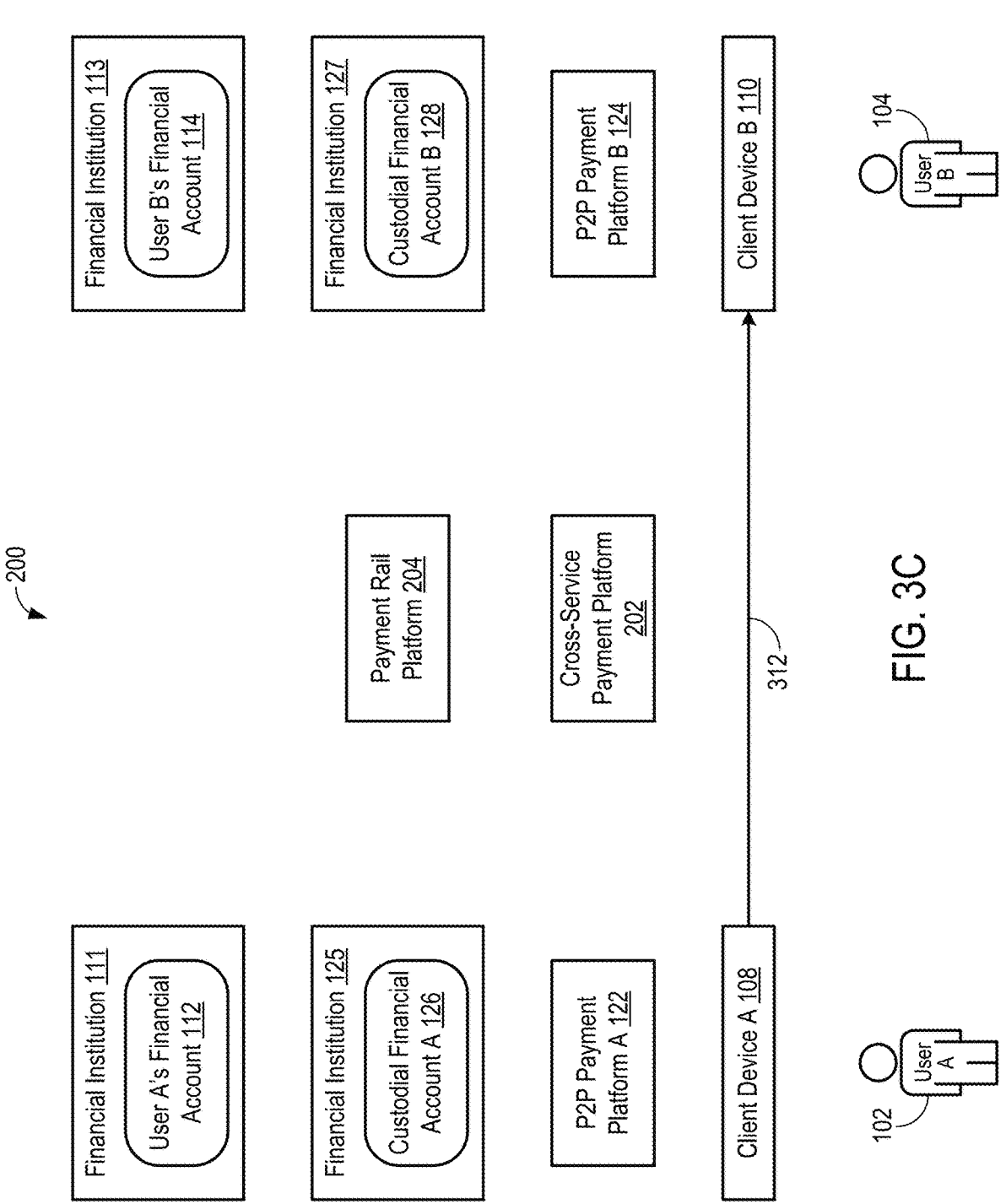
FIG. 3C depicts another example operation within the cross-service P2P payment environment depicted in FIG. 2 according to aspects of the disclosed technology.

As shown in FIG. 3C, once client device A 108 has received the transaction identifier, client device A 108 may send the transaction identifier to client device B 110 via data communication 312, which may take various forms. For instance, in examples where the transaction identifier is encoded into a QR code for display by client device A 108, data communication 312 may involve client device B 110 scanning the displayed QR code via a camera of client device B 110, and client device B 110 extracting the transaction identifier from the scanned QR code. Alternatively, client device A 108 may send the transaction identifier, whether or not encoded into a QR code, to client device B 110 over a data network, such as the Internet or a cellular network.

Figure 3D:
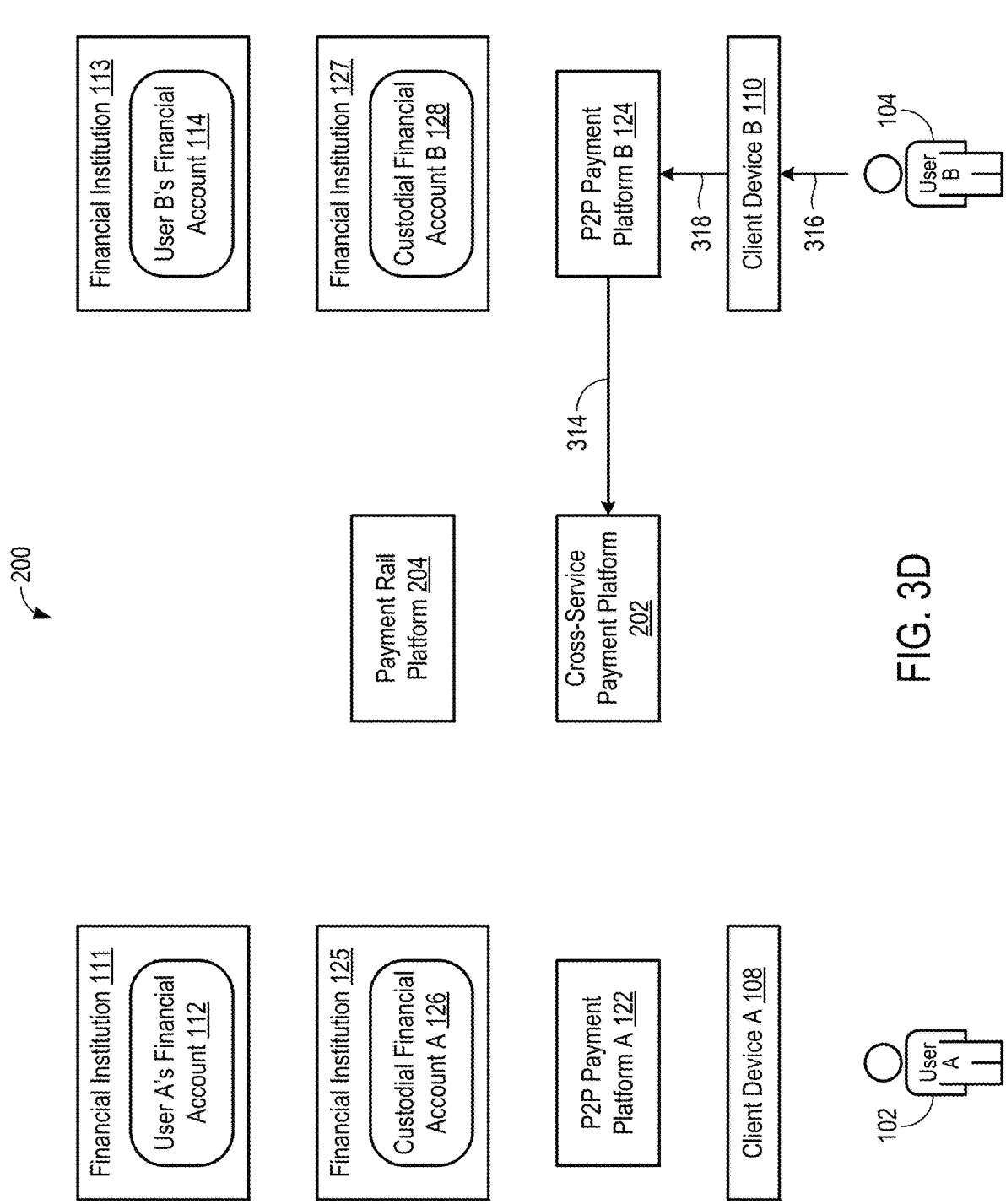
FIG. 3D depicts another example operation within the cross-service P2P payment environment depicted in FIG. 2 according to aspects of the disclosed technology.

As shown in FIG. 3D, the cross-service payment platform 202 may be further configured to receive a data communication 314 from P2P payment platform B 124 that includes the transaction identifier for the given cross-service transaction. P2P payment platform B 124 may send data communication 314 to the cross-service payment platform 202 based on an input from user B 104. For instance, user B 104 may provide user input 316 via the front-end software of the P2P payment application hosted by P2P payment platform B 124 and running on client device B 110. User input 316 may include a request to execute the given cross-service transaction and may take various forms, such as a touch input (e.g., a button press) or a voice command. Based on user input 316, client device B 110 may send the transaction identifier in data communication 318 to P2P payment platform B 124.

When sending the transaction identifier in data communication 318 to P2P payment platform B 124, client device B 110 may do so by sending the transaction identifier in an encoded form, such as in the form of the QR code received from client device A 108, or in an unencoded form, such as in the form of an alphanumeric string or some other form after client device B 110 has extracted the transaction identifier from the QR code. In some examples, client device B 110 may send the transaction identifier in data communication 318 to P2P payment platform B 124 when scanning the QR code displayed by client device A 108. For instance, the front-end software of the P2P payment application hosted by P2P payment platform B 124 and running on client device B 110 may include a QR code scanning feature that, when accessed by client device B 110, causes a camera of client device B 110 to scan for a QR code in the field of view of the camera. Alternatively, the front-end software may allow client device B 110 to upload an image of the QR code received from client device A 108 in data communication 312. In any case, whether scanning or uploading the QR code, client device B 110 may send the transaction identifier encoded in the QR code to P2P payment platform B 124 in data communication 318, and P2P payment platform B 124 may extract the transaction identifier from the QR code, or client device B 110 may extract the transaction identifier from the QR code and send the transaction identifier to P2P payment platform B 124 in data communication 318.

Once P2P payment platform B 124 has obtained the transaction identifier, P2P payment platform B 124 may send the transaction identifier in data communication 314 to the cross-service payment platform 202. By including the transaction identifier in data communication 314, the cross-service payment platform 202 may determine that data communication 314 is associated with the given cross-service transaction identified by the transaction identifier.

In addition to including the transaction identifier, data communication 314 may further include an identifier of user B's account with P2P payment platform B 124, which may take various forms such as one or more of a username or email address associated with user B's account, details of custodial financial account B 128 (e.g., the account number and/or routing number), details of client device B 110 (e.g., a network address, a mobile phone number, or the like), or any other distinct identifier of user B's account.

In examples where the identifier of user B's account does not explicitly include the account details (e.g., the account number and/or routing number) of custodial financial account B 128, the cross-service payment platform 202 may use the identifier of user B's account to determine the account details of custodial financial account B 128. For instance, the cross-service payment platform 202 may maintain or otherwise be provisioned with a lookup table containing entries for custodial financial accounts managed by P2P payment platform B 124. A given entry for a given custodial financial account may be associated with one or more identifiers of a corresponding user account, such as those identified above that may be included in data communication 314. As such, the cross-service payment plat-
form 202 may access the lookup table and use the identifier
of user B's account in data communication 314 to determine
the account details of custodial financial account B 128.
Namely, the cross-service payment platform 202 may iden-
tify the entry for custodial financial account B 128 as the
entry associated with the identifier of user B's account in
data communication 314. The cross-service payment plat-
form 202 may populate the lookup table based on user data
provided in advance to the cross-service payment platform
202 by P2P payment platform B 124. Additionally or
alternatively, the cross-service payment platform 202 may
continue to update the lookup table based on user data (e.g.,
user account identifiers and/or financial account details)
received from P2P payment platform B 124 when facilitat-
ing cross-service transactions as described herein.

In some examples, data communication 314 may still
further include one or more details of the given cross-service
transaction, such as data indicating an amount of funds to be
transferred in the transaction and/or whether user B's
account is the payor or payee in the transaction. To facilitate
this, user B 104 may specify such details of the given
cross-service transaction in user input 316, and client device
B 110 may send the details to P2P payment platform B 124
in data communication 318 for inclusion in data communi-
cation 314.

Based on receiving data communication 314, the cross-
service payment platform 202 may determine that the given
cross-service transaction comprises a cross-service transfer
of funds between custodial financial account A 126 and
custodial financial account B 128, and the cross-service
payment platform 202 may be equipped with sufficient
information to facilitate the transaction. For instance, at this
point in the process, the cross-service payment platform 202
has obtained the account details for custodial financial
account A 126 based on data communication 302, the
account details for custodial financial account B 128 based
on data communication 314, and the payor, payee, and
payment amount based on one or both of data communica-
tion 302 or data communication 314.

Once, the cross-service payment platform 202 has
obtained the account details for custodial financial account
A 126 and the account details for custodial financial account
B 128, the cross-service payment platform 202 may select a
given payment rail platform that is capable of transferring
funds between custodial financial account A 126 at financial
institution 125 and custodial financial account B 128 at
financial institution 127. As discussed above, the payment
rail platforms that are available for selection by the cross-
service payment platform 202 may take any of various
forms, examples of which may include ACH networks,
credit card networks, international payments networks, real-
time payment networks, and/or wire transfer networks,
among other possibilities.

In order for a payment rail platform to transfer funds to or
from an account held at a given financial institution, the
operator of the payment rail platform and the given financial
institution must have a preexisting agreement to cooperate
with each other, such that any given payment rail platform
may only be capable of transferring funds in connection with
certain financial institutions (i.e., those that are in preexist-
ing agreements with the operator of the payment rail plat-
form).

Accordingly, when selecting the payment rail platform
capable of transferring funds between custodial financial
account A 126 and custodial financial account B 128, the
cross-service payment platform 202 may determine the financial institution where custodial financial account A 126
is held and the financial institution where custodial financial
account B 128 is held. In some examples, the cross-service
payment platform 202 may determine this information based
on data communications received from P2P payment plat-
form A 122 and P2P payment platform B 124, respectively.
For instance, in line with the discussion above, P2P payment
platform A 122 may include an identifier of the financial
institution where custodial financial account A 126 is held
(e.g., a routing number of custodial financial account A 126)
in data communication 302, and the cross-service payment
platform 202 may determine the financial institution where
custodial financial account A 126 is held based on the
identifier in data communication 302. Similarly, P2P pay-
ment platform B 124 may include an identifier of the
financial institution where custodial financial account B 128
is held (e.g., a routing number of custodial financial account
B 128) in data communication 314, and the cross-service
payment platform 202 may determine the financial institu-
tion where custodial financial account B 128 is held based on
the identifier in data communication 314.

Once the cross-service payment platform 202 has deter-
mined the financial institution where custodial financial
account A 126 is held and the financial institution where
custodial financial account B 128 is held, the cross-service
payment platform 202 may select the given payment rail
platform that is capable of transferring funds between the
identified financial institutions (i.e., a payment rail platform
that has a preexisting agreement with both of the identified
financial institutions). In some examples, the cross-service
payment platform 202 may maintain, or otherwise have
access to, a lookup table containing entries for compatible
financial institutions for a set of payment rail platforms that
are available for selection and use by the cross-service
payment platform 202. In such examples, the cross-service
payment platform 202 may access the lookup table to
identify and select, from the set of available payment rail
platforms, a particular payment rail platform that is com-
patible with both financial institution 125 where custodial
financial account A 126 is held and financial institution 127
where custodial financial account B 128 is held. In a
scenario where multiple of the available payment rail plat-
forms are compatible with both financial institution 125 and
financial institution 127, the cross-service payment platform
202 may also be configured to select between the compatible
payment rail platforms based on any of various factors,
examples of which may include the platform types of the
different payment rail platforms (e.g., ACH, credit card
network, etc.), the transaction fees that are expected to be
charged by the different payment rail platforms, and/or the
transaction times that are expected for the different payment
rail platforms, among other possible factors.

Figure 3E:
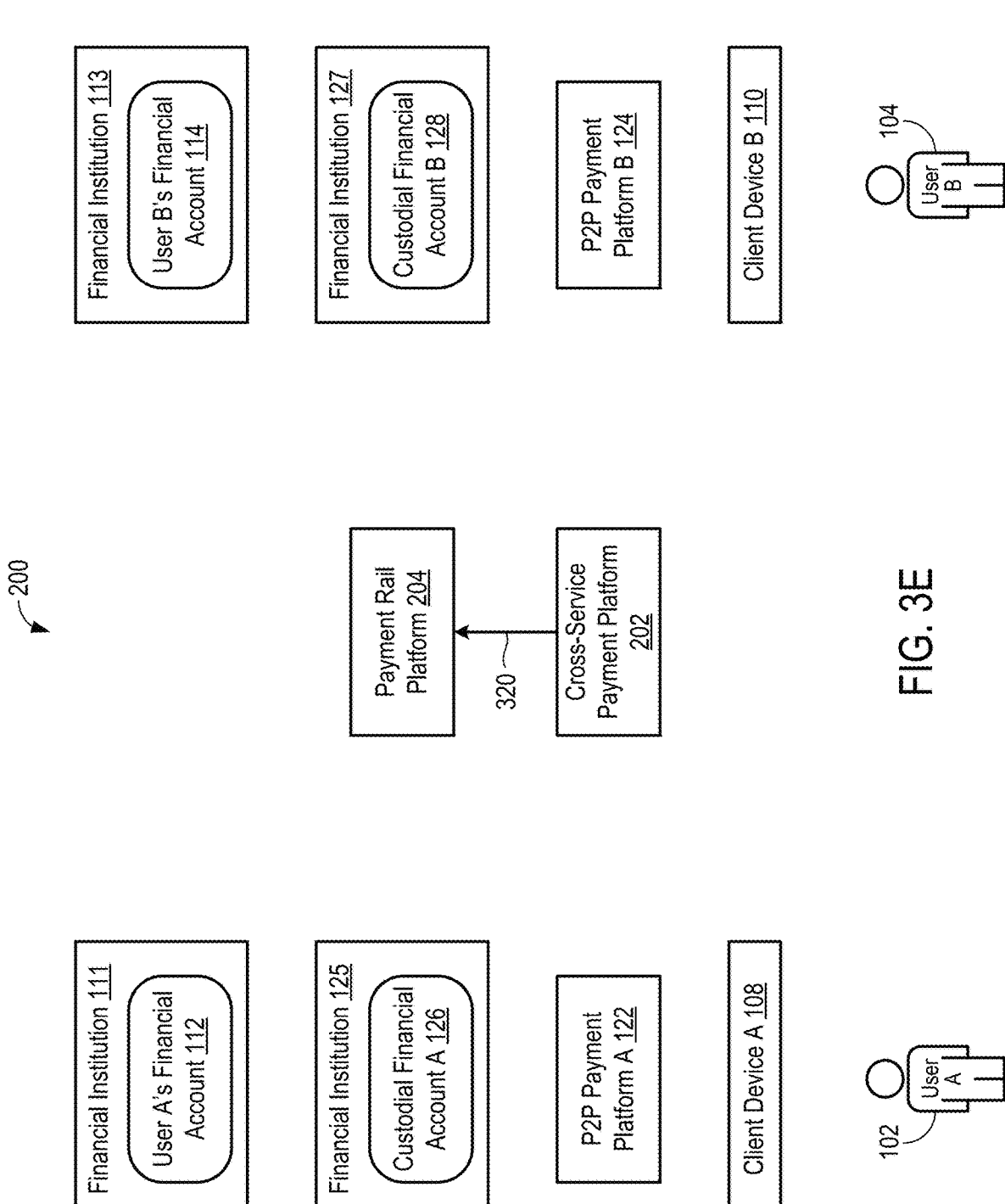
FIG. 3E depicts another example operation within the cross-service P2P payment environment depicted in FIG. 2 according to aspects of the disclosed technology.

As shown in FIG. 3E, the cross-service payment platform
202 selects payment rail platform 204 in the present
example, which could take any of the various forms
described above-including an ACH network, a credit card
network, an international payment network, a real-time
payment network, or a wire transfer network, among other
possibilities. The cross-service payment platform 202 may
then cause the selected payment rail platform 204 to execute
the given cross-service transaction, which may involve
transferring funds between custodial financial account A 126
and custodial financial account B 128. To do so, the cross-
service payment platform 202 may send data communica-
tion 320 to the payment rail platform 204. Data communi-
cation 320 may include an instruction to transfer funds as
well as any additional information required for the payment rail platform 204 to perform the transfer. For instance, data communication 320 may include, among other things, data identifying the account details of custodial financial account A 126 and custodial financial account B 128, as well as data identifying which of custodial financial account A 126 and custodial financial account B 128 is the payor account and which is the payee account.

While FIG. 3E shows the cross-service payment platform 202 selecting and utilizing a payment rail platform to execute the cross-service transaction that is separate from the cross-service payment platform 202, financial institution 125, and financial institution 127, it should be understood that other embodiments are possible as well. For instance, in one embodiment, it is possible that financial institution 125 and financial institution 127 may have set up a dedicated payment rail between those two financial institutions using an API or the like (e.g., an open banking API configured in accordance with the Open Bank Project), in which case the cross-service payment platform 202 may select this dedicated payment rail between financial institution 125 and financial institution 127 as the given payment rail platform to utilize for executing the cross-service transaction. In such an embodiment, the cross-service payment platform 202 may send data communication 320 to one or both of financial institution 125 or financial institution 127 in order to initiate the transfer of funds between custodial financial account A 126 and custodial financial account B 128.

In another embodiment, it is possible that the payment rail platform 204 may be operated by the same organization (and thus be included as part of the same overarching computing environment) as the cross-service payment platform 202. For example, it is possible that the organization implementing the cross-service payment platform 202 is also an operator of a payment rail platform, in which case the organization may include its own payment rail platform within the set of available payment rail platforms that can be selected and utilized by the cross-service payment platform 202. In such an embodiment, the cross-service payment platform 202 may still send data communication 320 to payment rail platform 204, but that data communication may remain within the organization's internal network.

Other variations are possible as well, including but not limited to the possibility that the cross-service payment platform 202 may be configured to utilize one single payment rail platform 204 to execute cross-service transactions as opposed to selecting between multiple possible payment rail platforms. For example, if the P2P payment services that have been integrated with the cross-service payment platform 202 use custodial financial institutions that are all subscribed to the same payment rail platform, then the cross-service payment platform 202 may be configured to utilize that payment rail platform for all cross-service transactions regardless of which specific custodial financial institutions are involved in a given transaction.

Figure 3F:
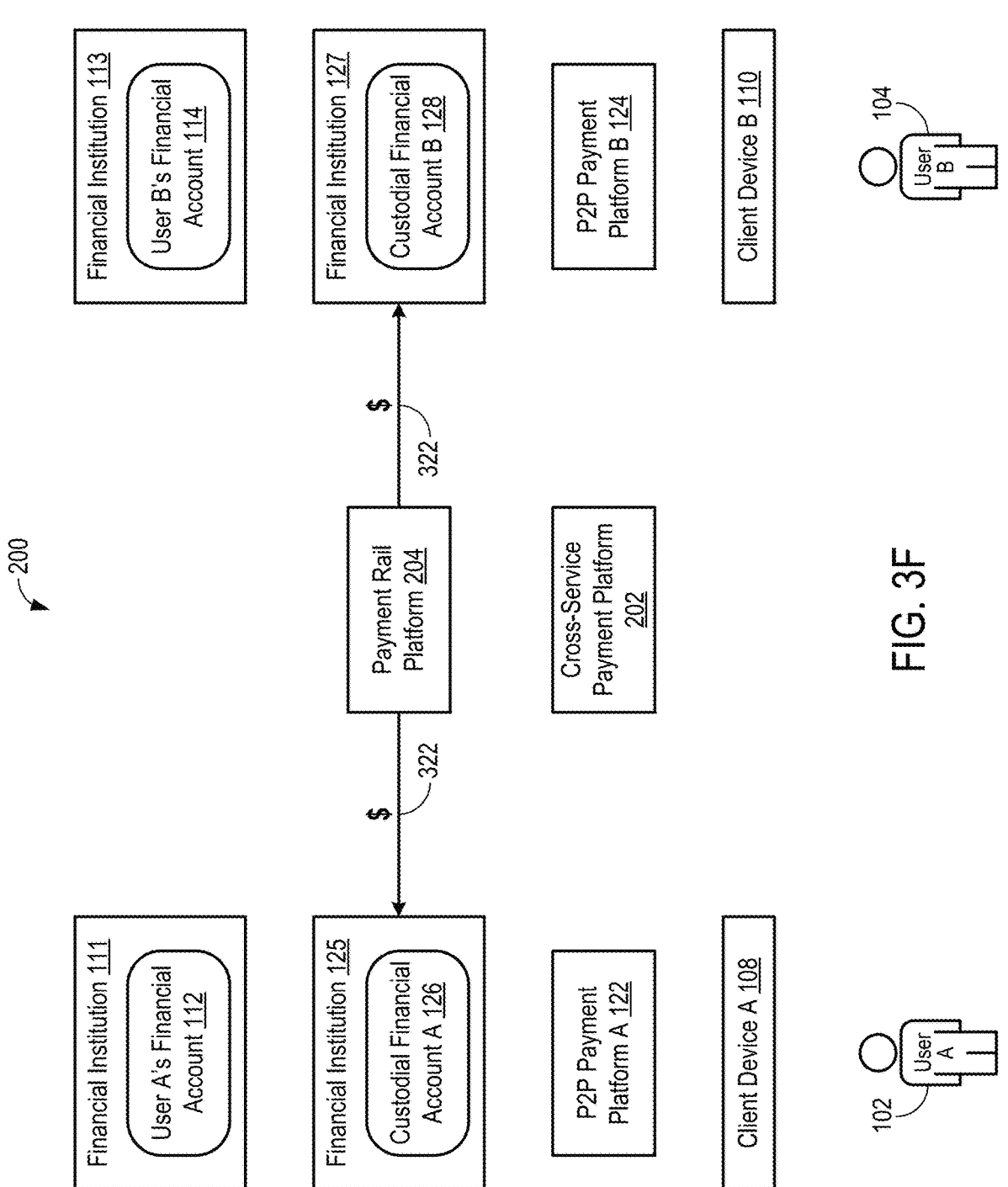
FIG. 3F depicts another example operation within the cross-service P2P payment environment depicted in FIG. 2 according to aspects of the disclosed technology.

Turning now to FIG. 3F, the payment rail platform 204 may use the data in data communication 320 to execute the given cross-service transaction by interfacing with financial institution 125 and financial institution 127 to transfer funds over payment rail 322 between custodial financial account A 126 at financial institution 125 and custodial financial account B 128 at financial institution 127. The payment rail platform 204 may do so using any technique for electronically transferring funds between financial institutions via a payment rail now known or later developed.

Figure 3G:
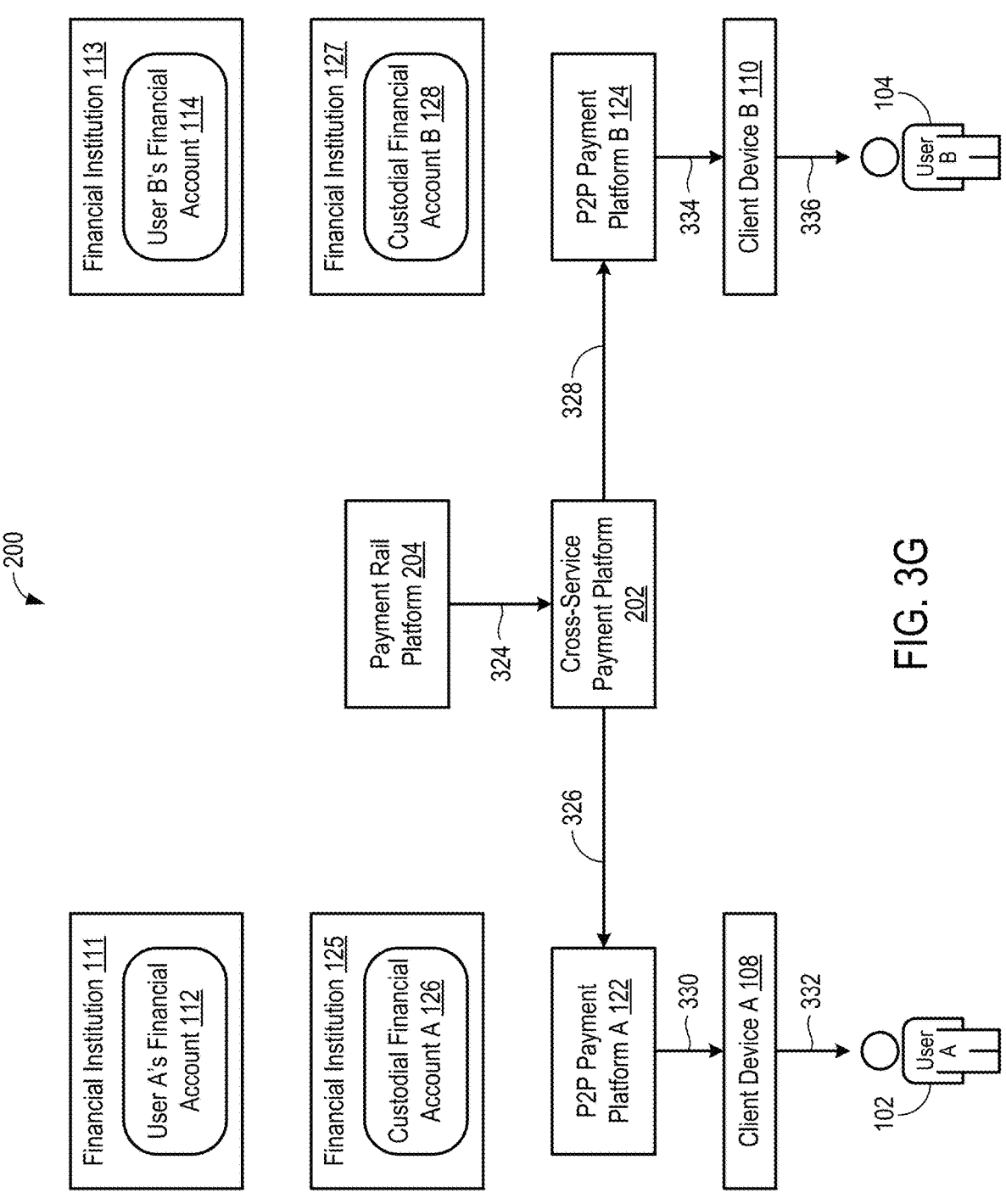
FIG. 3G depicts another example operation within the cross-service P2P payment environment depicted in FIG. 2 according to aspects of the disclosed technology.

As shown in FIG. 3G, once the funds have been transferred between custodial financial account A 126 at financial institution 125 and custodial financial account B 128 at financial institution 127, the payment rail platform 204 may send data communication 324 to the cross-service payment platform 202 confirming that the transfer is complete. The cross-service payment platform 202 may likewise send data communication 326 to P2P payment platform A 122 and data communication 328 to P2P payment platform B 124 confirming that the transfer is complete.

Further, P2P payment platform A 122 may notify user A 102 that the transfer is complete. For instance, P2P payment platform A 122 may send to client device A 108 a data communication 330 that includes an instruction causing client device A 108 to notify user A 102 that the transfer is complete. Client device A 108 may responsively display a notification 332 that the transfer is complete. The notification 332 may include a message confirming the transfer and/or an updated balance of custodial financial account A 126. To facilitate this, P2P payment platform A 122 may determine the updated balance of custodial financial account A 126 by querying the financial institution where custodial financial account A 126 is held and may include the updated balance in data communication 330.

Likewise, P2P payment platform B 124 may notify user B 104 that the transfer is complete. For instance, P2P payment platform B 124 may send to client device B 110 a data communication 334 that includes an instruction causing client device B 110 to notify user B 104 that the transfer is complete. Client device B 110 may responsively display a notification 336 that the transfer is complete. The notification 336 may include a message confirming the transfer and/or an updated balance of custodial financial account B 128. To facilitate this, P2P payment platform B 124 may determine the updated balance of custodial financial account B 128 by querying the financial institution where custodial financial account B 128 is held and may include the updated balance in data communication 334.

While the example P2P payment environment described above in connection with FIGS. 3A-3G involves a single cross-service P2P transaction, it should be understood that the functionalities described above in connection with this example environment may be applied to any number of cross-service P2P transactions, which may be carried out in more than one direction. For instance, in one cross-service P2P transaction, a user of P2P payment platform A 122 may be the payor and a user of P2P payment platform B 124 may be the payee, while in another cross-service P2P transaction, a user of P2P payment platform A 122 may be the payee and a user of P2P payment platform B 124 may be the payor.

III. Example Cross-service P2P Payment Methods

Turning now to FIG. 4, a flow diagram of an example process 400 is depicted that may be carried out by a cross-service payment system disclosed herein in order to facilitate transactions between independent P2P payment platforms, including a first P2P payment platform and a second P2P payment platform. The example process 400 may be carried out by the cross-service payment platform 202 of FIGS. 3A-3G for facilitating a transaction between P2P payment platform A 122 and P2P payment platform B 124 of FIGS. 3A-3G, but it should be understood that the example process 400 may be carried out by one or more computing platforms that take other forms, and in connection with first and second P2P payment platforms that take other forms as well. Further, it should be understood that, in practice, these functions of the cross-service payment system may be encoded in the form of program instructions that are executable by one or more processors of the cross-service payment system. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 4, the example process 400 may begin at block 402 with the cross-service payment system receiving, from a first P2P payment platform configured to provide a first P2P payment service, a first data communication that includes (i) a request from a first user account of the first P2P payment service that a given cross-service transaction be initiated with another user account of another P2P payment service and (ii) an identifier of the first user account. In line with the discussion above, the first data communication may further include at least one of (i) data specifying an amount of funds to be transferred in the given cross-service transaction or (ii) data specifying whether the first user account is a payor or a payee in the given cross-service transaction.

At block 404, based on the request, the cross-service payment system generates a transaction identifier for the given cross-service transaction.

At block 406, the cross-service payment system sends, to the first P2P payment platform, a second data communication that includes the transaction identifier for the given cross-service transaction. In line with the discussion above, the second data communication may include a QR code having the transaction identifier encoded therein.

At block 408, the cross-service payment system receives, from a second P2P payment platform configured to provide a second P2P payment service, a third data communication that includes (i) the transaction identifier and (ii) an identifier of a second user account of the second P2P payment service. In line with the discussion above, the third data communication may further include at least one of (i) data specifying an amount of funds to be transferred in the given cross-service transaction or (ii) data specifying whether the second user account is a payor or a payee in the given cross-service transaction.

At block 410, the cross-service payment system determines, based on the third data communication, that the given cross-service transaction comprises a cross-service transfer of funds between a first financial account associated with the first user account of the first P2P payment service and a second financial account associated with the second user account of the second P2P payment service. In line with the discussion above, this determination may be based on the third data communication including the transaction identifier.

At block 412, the cross-service payment system selects a payment rail capable of transferring funds between the first financial account and the second financial account. In line with the discussion above, this selection of the payment rail may involve (i) determining a first financial institution that manages the first financial account, (ii) determining a second financial institution that manages the second financial account, (iii) determining that a particular payment rail is capable of transferring funds between the first financial institution and the second financial institution, and (iv) selecting the particular payment rail. As further discussed above, in some example embodiments, determining that the particular payment rail is capable of transferring funds between the first financial institution and the second financial institution may involve accessing a lookup table containing entries for compatible financial institutions for a plurality of payment rails.

At block 414, the cross-service payment system causes the selected payment rail to transfer funds between the first and second financial accounts.

In some example embodiments, the process 400 may further involve the cross-service payment system performing various additional functions including at least one of (i) receiving, from the selected payment rail, a fourth data communication confirming the transfer of funds between the first and second financial accounts, (ii) sending, to the first P2P payment platform, a fifth data communication confirming the transfer of funds between the first and second financial accounts, or (iii) sending, to the second P2P payment platform, a sixth data communication confirming the transfer of funds between the first and second financial accounts.

Turning now to FIGS. 5 and 6, flow diagrams of a first example process 500 and a second example process 600 are depicted that may be carried out by a first computing platform associated with a first P2P payment service to interact with a cross-service computing platform that facilitates cross-service transactions between independent P2P payment services. The first example process 500 is a process for interacting with the cross-service platform on behalf of a first user account of the first P2P payment service that comprises an initiating participant of a first cross-service transaction with a first user account of a second P2P payment service, and the second example process 600 is a process for interacting with the cross-service platform on behalf of a second user account of the first P2P payment service that comprises a joining participant of a second cross-service transaction with a second user account of the second P2P payment service.

The first example process 500 and the second example process 600 may be carried out by either P2P payment platform A 122 or P2P payment platform B 124 of FIGS. 3A-3G for interacting with the cross-service payment platform 202 of FIGS. 3A-3G, but it should be understood that the first example process 500 and the second example process 600 may be carried out by one or more computing platforms that take other forms as well, and may be carried out for interacting with a cross-service platform that takes other forms as well. Further, it should be understood that, in practice, these functions of the first computing platform may be encoded in the form of program instructions that are executable by one or more processors of the first computing platform. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 5, the first example process 500 may begin at block 502 with the first computing platform receiving, from a first client device associated with the first user account of the first P2P payment service, a first type of data communication indicating a request by the first user account of the first P2P payment service that a first cross-service transaction be initiated with another user account of another P2P payment service.

At block 504, the first computing platform transmits, to the cross-service computing platform, a second type of data communication indicating the request by the first user account of the first P2P payment service that the first cross-service transaction be initiated with another user account of another P2P payment service. In line with the discussion above, the second type of data communication may include at least one of (i) data specifying an amount of funds to be transferred in the first cross-service transaction or (ii) data specifying whether the first user account of the first P2P payment service is a payor or a payee in the first cross-service transaction.

At block 506, the first computing platform receives, from the cross-service computing platform, a third type of data communication including a first transaction identifier for the first cross-service transaction that has been generated by the cross-service computing platform.

At block 508, the first computing platform transmits, to the first client device, a fourth type of data communication that causes the first client device to present the transaction identifier to a user of the first client device in a manner that enables the user of the first client device to provide the first transaction identifier for the first cross-service transaction to a user of another client device associated with the first user account of the second P2P payment service.

In line with the discussion above, one or both of the third type of data communication and the fourth type of data communication may include a QR code having the first transaction identifier encoded therein.

At block 510, the first computing platform receives, from the cross-service computing platform, a fifth type of data communication indicating that the first cross-service transaction has been successfully settled. In line with the discussion above, the first cross-service transaction may include a transfer of funds between one financial account associated with the first user account of the first P2P payment service and another financial account associated with the first user account of the second P2P payment service, and the first cross-service transaction may be settled by a payment rail that is selected by the cross-service computing platform.

As shown in FIG. 6, the second example process 600 may begin at block 602 with the first computing platform receiving, from a second client device associated with the second user account of the first P2P payment service, a sixth type of data communication indicating a request by the second user account of the first P2P payment service to participate in a second cross-service transaction with the second user account of the second P2P payment service, wherein the sixth type of data communication comprises a second transaction identifier for the second cross-service transaction that (i) was initially generated by the cross-service computing platform based on a request from the second user account of the second P2P payment service and (ii) was subsequently received by the second client device. In line with the discussion above, the second transaction identifier may have been encoded in a QR code that was received by the second client device.

At block 604, the first computing platform transmits, to the cross-service computing platform, a seventh type of data communication that indicates the request by the second user account of the first P2P payment service to participate in the second cross-service transaction with the second user account of the second P2P payment service, wherein the seventh type of data communication includes at least (i) the second transaction identifier and (ii) an identifier of the second user account of the first P2P payment service, and wherein the seventh type of data communication causes the cross-service computing platform to invoke the second cross-service transaction. In line with the discussion above, the seventh type of data communication may further include at least one of (i) data specifying an amount of funds to be transferred in the second cross-service transaction or (ii) data specifying whether the second user account is a payor or a payee in the second cross-service transaction.

At block 606, the first computing platform receives, from the cross-service computing platform, an eighth type of data communication indicating that the second cross-service transaction has been successfully settled. In line with the discussion above, the second cross-service transaction may include a transfer of funds between one financial account associated with the second user account of the first P2P payment service and another financial account associated with the second user account of the second P2P payment service, and the second cross-service transaction may be settled by a payment rail that is selected by the cross-service computing platform.

IV. Example Computing Platform

Figure 7:
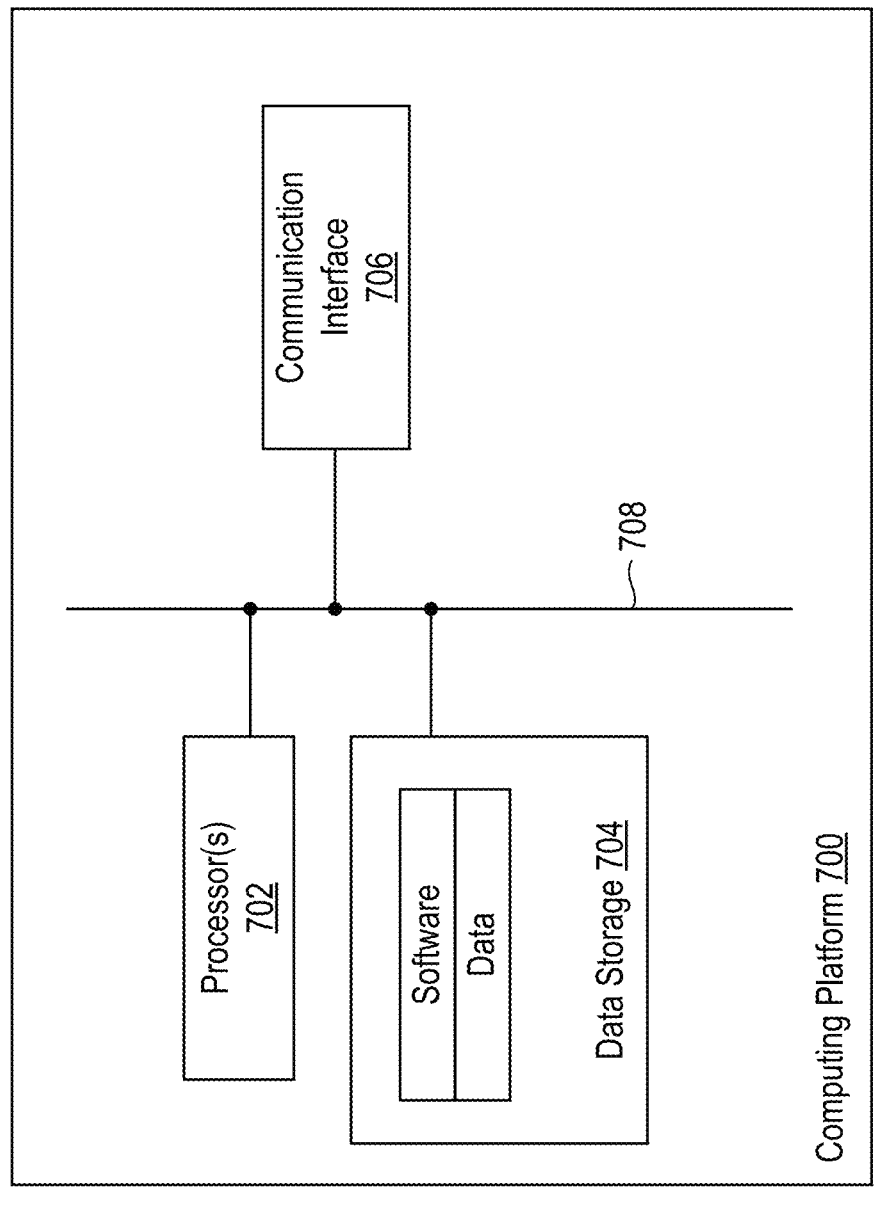
FIG. 7 depicts example structural components of an example computing platform that may be configured for facilitating cross-service P2P payments according to aspects of the disclosed technology.

FIG. 7 is a simplified block diagram illustrating some structural components that may be included in an example computing platform 700, which could serve as, for instance, any of the P2P payment platforms described herein and/or the cross-service payment platform 202. Computing platform 700 may be configured to carry out any of the various functions disclosed herein-including but not limited to any of the functions of P2P payment platform A 122, P2P payment platform B 124, and/or cross-service payment platform 202 described with reference to FIGS. 3A-3G, as well as any of the computing platform functions described with reference to FIGS. 4-6. At a high level, computing platform 700 may generally comprise any one or more computer systems (e.g., one or more servers) that collectively include at least a processor 702, data storage 704, and a communication interface 706, all of which may be communicatively linked by a communication link 708 that may take the form of a system bus, a communication network such as a public, private, or hybrid cloud, or some other connection mechanism. Each of these components may take various forms.

For instance, processor 702 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. It should also be understood that processor 702 could comprise processing components that are distributed across a plurality of physical computing devices connected via a network, such as a computing cluster of a public, private, or hybrid cloud.

In turn, data storage 704 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. It should also be understood that data storage 704 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 7, data storage 704 may be capable of storing both (i) program instructions that are executable by processor 702 such that the computing platform 700 is configured to perform any of the various functions disclosed herein (including but not limited to any of the functions of P2P payment platform A 122, P2P payment platform B 124, and/or cross-service payment platform 202 described with reference to FIGS. 3A-3G, as well as any of the computing platform functions described with reference to FIGS. 4-6), and (ii) data that may be received, derived, or otherwise stored by computing platform 700. For instance, data storage 704 may store a transaction identifier for a cross-service transaction as well as any corresponding data received in communications from the P2P payment platforms and/or client devices involved in the cross-service transaction, among other possibilities.

Communication interface 706 may take the form of any one or more interfaces that facilitate communication between computing platform 700 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

It should be understood that computing platform 700 is one example of a computing platform that may be used with the embodiments described herein. Numerous other arrangements are possible and contemplated herein. For instance, other computing platforms may include additional components not pictured and/or more or less of the pictured components.

V. Example Client Device

Figure 8:
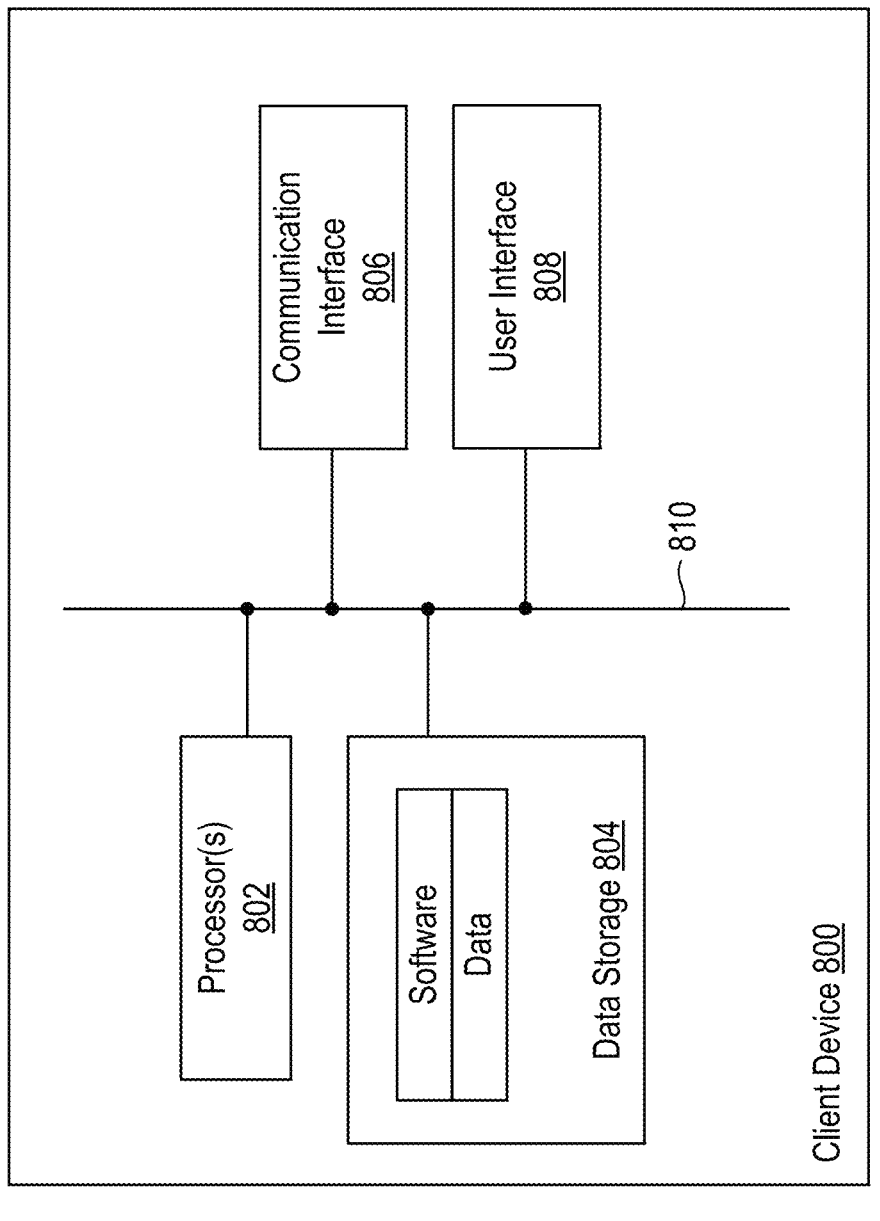
FIG. 8 depicts example structural components of an example client device that may be configured for facilitating cross-service P2P payments according to aspects of the disclosed technology.

FIG. 8 is a simplified block diagram illustrating some structural components that may be included in an example client device 800, which could serve as, for instance, any of the client devices described herein. Client device 800 may be configured to carry out any of the various functions disclosed herein-including but not limited to any of the functions of client device A 108 and/or client device B 110 described with reference to FIGS. 3A-3G. As representative examples, client device 800 may take the form of a desktop computer, a laptop, a netbook, a tablet, a smartphone, and/or a personal digital assistant (PDA), among other possibilities. In this respect, client device 800 may include at least a processor 802, data storage 804, communication interface 806, and user interface 808, all of which may be communicatively linked by a communication link 810 that may take the form of a system bus, a communication network such as a public, private, or hybrid cloud, or some other connection mechanism. Each of these components may take various forms.

For instance, processor 802 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

In turn, data storage 804 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 8, data storage 804 may be capable of storing both (i) program instructions that are executable by processor 802 such that the client device 800 is configured to perform any of the various functions disclosed herein (including but not limited to any of the functions of client device A 108 and/or client device B 110 described with reference to FIGS. 3A-3G), and (ii) data that may be received, derived, or otherwise stored by client device 800. For instance, data storage 804 may store a transaction identifier for a cross-service transaction as well as any corresponding data received in communications from the P2P payment platforms involved in the cross-service transaction, among other possibilities.

Communication interface 806 may take the form of any one or more interfaces that facilitate communication between client device 800 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

User interface 808 may take the form of one or more components that facilitate user interaction with client device 800, such as a keyboard, a mouse, a trackpad, a display screen, a touch-sensitive interface, a stylus, a virtual-reality headset, and/or speakers, among other possibilities.

It should be understood that client device 800 is one example of a client device that may be used with the embodiments described herein. Numerous other arrangements are possible and contemplated herein. For instance, other client devices may include additional components not pictured and/or more or less of the pictured components.

VI. Conclusion

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A first computing platform that is configured to host a first peer-to-peer (P2P) payment service for electronically transferring money among a first set of users that is accessible via client devices running a first software application, the first computing platform comprising:

at least one network interface;

at least one processor;

data storage comprising at least one non-transitory computer-readable medium;

program instructions stored in the data storage that are executable by the at least one processor such that the first computing platform is configured to operate within a network environment comprising (i) a second computing platform hosting a second P2P payment service for electronically transferring money among a second set of users that is accessible via client devices running a second software application, and (ii) a cross-service computing platform that is configured to act as an intermediary between the first computing platform and the second computing platform, wherein the first and second P2P payment services are independent from one another, the first and second software applications are different from one another, the first and second computing platforms are different from one another, and the first and second sets of users are different from one another, wherein the program instructions are executable to cause the first computing platform to interact with the cross-service computing platform on behalf of a first user of the first P2P payment service that comprises an initiating participant of a cross-service transaction by:

receiving, from a first client device associated with the first user via a first communication path comprising at least one data network, a first type of data communication indicating a request by the first user of the first P2P payment service to initiate the cross-service transaction;

based on receiving the first type of data communication, determining that the first user of the first P2P payment service has requested initiation of the cross-service transaction and transmitting, to the cross-service computing platform via a second communication path comprising at least one data network, a second type of data communication indicating the request by the first user of the first P2P payment service to initiate the cross-service transaction, wherein the second type of data communication causes the cross-service computing platform to determine that the first user of the first P2P payment service is the initiating participant of the cross-service transaction and generate a cross-service transaction identifier for the cross-service transaction that is to be utilized to commonly identify and carry out the cross-service transaction;

after transmitting the second type of data communication, receiving, from the cross-service computing platform via a third communication path comprising at least one data network, a third type of data communication including the cross-service transaction identifier for the cross-service transaction that has been generated by the cross-service computing platform;

based on receiving the third type of data communication, transmitting, to the first client device via a fourth communication path comprising at least one data network, a fourth type of data communication that causes the first client device to present the cross-service transaction identifier for the cross-service transaction to the first user in a manner that enables the first user to share the cross-service transaction identifier for the cross-service transaction with a second user of the second P2P payment service, wherein the cross-service transaction identifier for the cross-service transaction is thereafter shared by the first user with the second user, sent by a second client device associated with the second user to the second computing platform hosting the second P2P payment service, and sent by the second computing platform to the cross-service computing platform; and after the cross-service transaction identifier has been utilized by the cross-service computing platform to initiate an electronic transfer of funds between the first user of the first P2P payment service and the second user of the second P2P payment service, receiving, from the cross-service computing platform via a fifth communication path comprising at least one data network, a fifth type data communication indicating that the cross-service transaction has been successfully settled.

2. The first computing platform of claim 1, wherein, after the cross-service transaction identifier is sent by the second computing platform to the cross-service computing platform, the cross-service computing platform functions to receive the cross-service transaction identifier from the second computing platform and then utilize the cross-service transaction identifier to initiate the electronic transfer of funds between the first user of the first P2P payment service and the second user of the second P2P payment service by (i) determining that the second user of the second P2P payment service is a joining participant of the cross-service transaction, (ii) selecting a payment rail platform capable of electronically transferring funds between a first financial account associated with the first user of the first P2P payment service and a second financial account associated with the second user of the second P2P payment service, and (iii) sending, to the selected payment rail platform, an instruction to electronically transfer funds between the first and second financial accounts and thereby causing the selected payment rail platform to electronically transfer funds between the first and second financial accounts.

3. The first computing platform of claim 1, wherein the second type of data communication includes, (i) an identifier of an account of the first user with the first P2P payment service, (ii) data specifying an amount of funds to be transferred in the cross-service transaction, and (iii) data specifying whether the first user of the first P2P payment service is to be a payor or a payee in the cross-service transaction.

4. The first computing platform of claim 1, wherein the fourth type of data communication that causes the first client device to present the cross-service transaction identifier for the cross-service transaction to the first user in the manner that enables the first user to share the cross-service transaction identifier for the cross-service transaction with the second user comprises:

a communication that causes the first client device to present the cross-service transaction identifier for the cross-service transaction to the first user via a Quick Response (QR) code that encodes the cross-service transaction identifier.

5. The first computing platform of claim 4, wherein the QR code is included as part of the communication.

6. The first computing platform of claim 1, wherein:

the first communication path and the fourth communication path are the same; and the second communication path, the third communication path, and the fifth communication path are the same.

7. The first computing platform of claim 1, wherein the first user is represented by a first user account of the first P2P payment service and the second user is represented by a second user account of the second P2P payment service.

8. The first computing platform of claim 1, wherein the first client device is running an instance of the first software application and the second client device is running an instance of the second software application.

9. The first computing platform of claim 1, wherein the cross-service transaction comprises a first cross-service transaction and the cross-service transaction identifier comprises a first cross-service transaction identifier, and wherein the program instructions are further executable to cause the first computing platform to interact with the cross-service computing platform on behalf of a third user of the first P2P payment service that comprises a joining participant of a second cross-service transaction by:

after the second cross-service transaction has been initiated by a fourth user of the second P2P payment service, receiving, from a third client device associated with the third user via a sixth communication path comprising at least one data network, a sixth type of data communication indicating a request by the third user of the first P2P payment service to participate in the second cross-service transaction with the fourth user of the second P2P payment service, wherein the sixth type of data communication comprises a second cross-service transaction identifier for the second cross-service transaction that is to be utilized to commonly identify and carry out the second cross-service transaction, and wherein the second cross-service transaction identifier (i) was initially generated by the cross-service computing platform based on a determination that the fourth user of the second P2P payment service was an initiating participant of the second cross-service transaction, (ii) was sent from the cross-service computing platform to the second computing platform hosting the second P2P payment service and then sent to a fourth client device associated with the fourth user, and (iii) was subsequently received by the fourth client device;

based on receiving the sixth type of data communication, determining that the third user of the first P2P payment service has requested to participate in the second cross-service transaction with the fourth user of the second P2P payment service and transmitting, to the cross-service computing platform via a seventh communication path comprising at least one data network, a seventh type of data communication that indicates the request by the third user of the first P2P payment service to participate in the second cross-service transaction with the fourth user of the second P2P payment service, wherein the seventh type data communication includes at least (i) the second cross-service transaction identifier and (ii) an identifier of the third user of the first P2P payment service; and after the second cross-service transaction identifier has been utilized by the cross-service computing platform to initiate an electronic transfer of funds between the third user of the first P2P payment service and the fourth user of the second P2P payment service, receiving, from the cross-service computing platform via an eighth communication path comprising at least one data network, an eighth type of data communication indicating that the second cross-service transaction has been successfully settled.

10. A non-transitory computer-readable medium provisioned with program instructions for a first computing platform that is configured to host a first peer-to-peer (P2P) payment service for electronically transferring money among a first set of users that is accessible via client devices running a first software application, wherein the program instructions are executable by at least one processor of the first computing platform such that the first computing platform is configured to operate within a network environment comprising (i) a second computing platform hosting a second P2P payment service for electronically transferring money among a second set of users that is accessible via client devices running a second software application, and (ii) a cross-service computing platform that is configured to act as an intermediary between the first computing platform and the second computing platform, wherein the first and second P2P payment services are independent from one another, the first and second software applications are different from one another, the first and second computing platforms are different from one another, and the first and second sets of users are different from one another, and wherein the program instructions are executable to cause the first computing platform to interact with the cross-service computing platform on behalf of a first user of the first P2P payment service that comprises an initiating participant of a cross-service transaction by:

receiving, from a first client device associated with the first user via a first communication path comprising at least one data network, a first type of data communication indicating a request by the first user of the first P2P payment service to initiate the cross-service transaction;

based on receiving the first type of data communication, determining that the first user of the first P2P payment service has requested initiation of the cross-service transaction and transmitting, to the cross-service computing platform via a second communication path comprising at least one data network, a second type of data communication indicating the request by the first user of the first P2P payment service to initiate the cross-service transaction, wherein the second type of data communication causes the cross-service computing platform to determine that the first user of the first P2P payment service is the initiating participant of the cross-service transaction and generate a cross-service transaction identifier for the cross-service transaction that is to be utilized to commonly identify and carry out the cross-service transaction;

after transmitting the second type of data communication, receiving, from the cross-service computing platform via a third communication path comprising at least one data network, a third type of data communication including the cross-service transaction identifier for the cross-service transaction that has been generated by the cross-service computing platform;

based on receiving the third type of data communication, transmitting, to the first client device via a fourth communication path comprising at least one data network, a fourth type of data communication that causes the first client device to present the cross-service transaction identifier for the cross-service transaction to the first user in a manner that enables the first user to share the cross-service transaction identifier for the cross-service transaction with a second user of the second P2P payment service, wherein the cross-service transaction identifier for the cross-service transaction is thereafter shared by the first user with the second user, sent by a second client device associated with the second user to the second computing platform hosting the second P2P payment service, and sent by the second computing platform to the cross-service computing platform; and after the cross-service transaction identifier has been utilized by the cross-service computing platform to initiate an electronic transfer of funds between the first user of the first P2P payment service and the second user of the second P2P payment service, receiving, from the cross-service computing platform via a fifth communication path comprising at least one data network, a fifth type data communication indicating that the cross-service transaction has been successfully settled.

11. The non-transitory computer-readable medium of claim 10, wherein, after the cross-service transaction identifier is sent by the second computing platform to the cross-service computing platform, the cross-service computing platform functions to receive the cross-service transaction identifier from the second computing platform and then utilize the cross-service transaction identifier to initiate the electronic transfer of funds between the first user of the first P2P payment service and the second user of the second P2P payment service by (i) determining that the second user of the second P2P payment service is a joining participant of the cross-service transaction, (ii) selecting a payment rail platform capable of electronically transferring funds between a first financial account associated with the first user of the first P2P payment service and a second financial account associated with the second user of the second P2P payment service, and (iii) sending, to the selected payment rail platform, an instruction to electronically transfer funds between the first and second financial accounts and thereby causing the selected payment rail platform to electronically transfer funds between the first and second financial accounts.

12. The non-transitory computer-readable medium of claim 10, wherein the fourth type of data communication that causes the first client device to present the cross-service transaction identifier for the cross-service transaction to the first user in the manner that enables the first user to share the cross-service transaction identifier for the cross-service transaction with the second user comprises:

a communication that causes the first client device to present the cross-service transaction identifier for the cross-service transaction to the first user via a Quick Response (QR) code that encodes the cross-service transaction identifier.

13. The non-transitory computer-readable medium of claim 10, wherein:

the first communication path and the fourth communication path are the same; and the second communication path, the third communication path, and the fifth communication path are the same.

14. The non-transitory computer-readable medium of claim 10, wherein the cross-service transaction comprises a first cross-service transaction and the cross-service transaction identifier comprises a first cross-service transaction identifier, and wherein the program instructions are further executable to cause the first computing platform to interact with the cross-service computing platform on behalf of a third user of the first P2P payment service that comprises a joining participant of a second cross-service transaction by:

after the second cross-service transaction has been initiated by a fourth user of the second P2P payment service, receiving, from a third client device associated with the third user via a sixth communication path comprising at least one data network, a sixth type of data communication indicating a request by the third user of the first P2P payment service to participate in the second cross-service transaction with the fourth user of the second P2P payment service, wherein the sixth type of data communication comprises a second cross-service transaction identifier for the second cross-service transaction that is to be utilized to commonly identify and carry out the second cross-service transaction, and wherein the second cross-service transaction identifier (i) was initially generated by the cross-service computing platform based on a determination that the fourth user of the second P2P payment service was an initiating participant of the second cross-service transaction, (ii) was sent from the cross-service computing platform to the second computing platform hosting the second P2P payment service and then sent to a fourth client device associated with the fourth user, and (iii) was subsequently received by the fourth client device;

based on receiving the sixth type of data communication, determining that the third user of the first P2P payment service has requested to participate in the second cross-service transaction with the fourth user of the second P2P payment service and transmitting, to the cross-service computing platform via a seventh communication path comprising at least one data network, a seventh type of data communication that indicates the request by the third user of the first P2P payment service to participate in the second cross-service transaction with the fourth user of the second P2P payment service, wherein the seventh type data communication includes at least (i) the second cross-service transaction identifier and (ii) an identifier of the third user of the first P2P payment service; and after the second cross-service transaction identifier has been utilized by the cross-service computing platform to initiate an electronic transfer of funds between the third user of the first P2P payment service and the fourth user of the second P2P payment service, receiving, from the cross-service computing platform via an eighth communication path comprising at least one data network, an eighth type of data communication indicating that the second cross-service transaction has been successfully settled.

15. A method carried out by a first computing platform that is configured to host a first peer-to-peer (P2P) payment service for electronically transferring money among a first set of users that is accessible to users via client devices running a first software application, the method enabling the first computing platform to operate within a network environment comprising (i) a second computing platform hosting a second P2P payment service for electronically transferring money among a second set of users that is accessible via client devices running a second software application, and (ii) a cross-service computing platform that is configured to act as an intermediary between the first computing platform and the second computing platform, wherein the first and second P2P payment services are independent from one another, the first and second software applications are different from one another, the first and second computing platforms are different from one another, and the first and second sets of users are different from one another, the method comprising interacting with the cross-service computing platform on behalf of a first user of the first P2P payment service that comprises an initiating participant of a cross-service transaction by:

receiving, from a first client device associated with the first user via a first communication path comprising at least one data network, a first type of data communication indicating a request by the first user of the first P2P payment service to initiate the cross-service transaction;

based on receiving the first type of data communication, determining that the first user of the first P2P payment service has requested initiation of the cross-service transaction and transmitting, to the cross-service computing platform via a second communication path comprising at least one data network, a second type of data communication indicating the request by the first user of the first P2P payment service to initiate the cross-service transaction, wherein the second type of data communication causes the cross-service computing platform to determine that the first user of the first P2P payment service is the initiating participant of the cross-service transaction and generate a cross-service transaction identifier for the cross-service transaction that is to be utilized to commonly identify and carry out the cross-service transaction;

after transmitting the second type of data communication, receiving, from the cross-service computing platform via a third communication path comprising at least one data network, a third type of data communication including the cross-service transaction identifier for the cross-service transaction that has been generated by the cross-service computing platform;

based on receiving the third type of data communication, transmitting, to the first client device via a fourth communication path comprising at least one data network, a fourth type of data communication that causes the first client device to present the cross-service transaction identifier for the cross-service transaction to the first user in a manner that enables the first user to share the cross-service transaction identifier for the cross-service transaction with a second user of the second P2P payment service, wherein the cross-service transaction identifier for the cross-service transaction is thereafter shared by the first user with the second user, sent by a second client device associated with the second user to the second computing platform hosting the second P2P payment service, and sent by the second computing platform to the cross-service computing platform; and after the cross-service transaction identifier has been utilized by the cross-service computing platform to initiate an electronic transfer of funds between the first user of the first P2P payment service and the second user of the second P2P payment service, receiving, from the cross-service computing platform via a fifth communication path comprising at least one data network, a fifth type data communication indicating that the cross-service transaction has been successfully settled.

16. The method of claim 15, wherein, after the cross-service transaction identifier is sent by the second computing platform to the cross-service computing platform, the cross-service computing platform functions to receive the cross-service transaction identifier from the second computing platform and then utilize the cross-service transaction identifier to initiate the electronic transfer of funds between the first user of the first P2P payment service and the second user of the second P2P payment service by (i) determining that the second user of the second P2P payment service is a joining participant of the cross-service transaction, (ii) selecting a payment rail platform capable of electronically transferring funds between a first financial account associated with the first user of the first P2P payment service and a second financial account associated with the second user of the second P2P payment service, and (iii) sending, to the selected payment rail platform, an instruction to electronically transfer funds between the first and second financial accounts and thereby causing the selected payment rail platform to electronically transfer funds between the first and second financial accounts.

17. The method of claim 15, wherein the fourth type of data communication that causes the first client device to present the cross-service transaction identifier for the cross-service transaction to the first user in the manner that enables the first user to share the cross-service transaction identifier for the cross-service transaction with the second user comprises:

a communication that causes the first client device to present the cross-service transaction identifier for the cross-service transaction to the first user via a Quick Response (QR) code that encodes the cross-service transaction identifier.

18. The method of claim 15, wherein:

the first communication path and the fourth communication path are the same; and the second communication path, the third communication path, and the fifth communication path are the same.

19. The method of claim 15, wherein the first client device is running an instance of the first software application and the second client device is running an instance of the second software application.

20. The method of claim 15, wherein the cross-service transaction comprises a first cross-service transaction and the cross-service transaction identifier comprises a first cross-service transaction identifier, the method further comprising interacting with the cross-service computing platform on behalf of a third user of the first P2P payment service that comprises a joining participant of a second cross-service transaction by:

after the second cross-service transaction has been initiated by a fourth user of the second P2P payment service, receiving, from a third client device associated with the third user via a sixth communication path comprising at least one data network, a sixth type of data communication indicating a request by the third user of the first P2P payment service to participate in the second cross-service transaction with the fourth user of the second P2P payment service, wherein the sixth type of data communication comprises a second cross-service transaction identifier for the second cross-service transaction that is to be utilized to commonly identify and carry out the second cross-service transaction, and wherein the second cross-service transaction identifier (i) was initially generated by the cross-service computing platform based on a determination that the fourth user of the second P2P payment service was an initiating participant of the second cross-service transaction, (ii) was sent from the cross-service computing platform to the second computing platform hosting the second P2P payment service and then sent to a fourth client device associated with the fourth user, and (iii) was subsequently received by the fourth client device;

based on receiving the sixth type of data communication, determining that the third user of the first P2P payment service has requested to participate in the second cross-service transaction with the fourth user of the second P2P payment service and transmitting, to the cross-service computing platform via a seventh communication path comprising at least one data network, a seventh type of data communication that indicates the request by the third user of the first P2P payment service to participate in the second cross-service transaction with the fourth user of the second P2P payment service, wherein the seventh type data communication includes at least (i) the second cross-service transaction identifier and (ii) an identifier of the third user of the first P2P payment service; and after the second cross-service transaction identifier has been utilized by the cross-service computing platform to initiate an electronic transfer of funds between the third user of the first P2P payment service and the fourth user of the second P2P payment service, receiving, from the cross-service computing platform via an eighth communication path comprising at least one data network, an eighth type of data communication indicating that the second cross-service transaction has been successfully settled.

* * * * *